United States Patent
Kakinuma et al.

(10) Patent No.: US 9,755,249 B2
(45) Date of Patent: *Sep. 5, 2017

(54) SOLID OXIDE FUEL CELL STACK

(71) Applicant: TOTO LTD., Kitakyushu-shi, Fukuoka (JP)

(72) Inventors: Yasuo Kakinuma, Kanagawa-ken (JP); Osamu Okamoto, Kanagawa-ken (JP); Shigeru Ando, Kanagawa-ken (JP); Hironobu Murakami, Kanagawa-ken (JP); Seiki Furuya, Kanagawa-ken (JP); Yutaka Momiyama, Kanagawa-ken (JP); Kiyoshi Hayama, Kanagawa-ken (JP); Naoki Watanabe, Kanagawa-ken (JP); Shuhei Tanaka, Kanagawa-ken (JP); Nobuo Isaka, Kanagawa-ken (JP); Takuya Hoshiko, Kanagawa-ken (JP); Masaki Sato, Kanagawa-ken (JP)

(73) Assignee: Toto Ltd., Fukuoka (JP)

( * ) Notice: Subject to any disclaimer, the term of this patent is extended or adjusted under 35 U.S.C. 154(b) by 127 days.

This patent is subject to a terminal disclaimer.

(21) Appl. No.: 14/869,104

(22) Filed: Sep. 29, 2015

(65) Prior Publication Data

US 2016/0093896 A1 Mar. 31, 2016

(30) Foreign Application Priority Data

Sep. 30, 2014 (JP) .................................. 2014-202407
Sep. 30, 2014 (JP) .................................. 2014-202410
(Continued)

(51) Int. Cl.
*H01M 8/0202* (2016.01)
*H01M 8/24* (2016.01)
(Continued)

(52) U.S. Cl.
CPC .......... *H01M 8/0202* (2013.01); *H01M 8/12* (2013.01); *H01M 8/1213* (2013.01);
(Continued)

(58) Field of Classification Search
CPC .................... H01M 2008/1293; H01M 8/2425
See application file for complete search history.

(56) References Cited

U.S. PATENT DOCUMENTS

2016/0093897 A1* 3/2016 Kakinuma .......... H01M 8/0202
429/465

FOREIGN PATENT DOCUMENTS

JP 2010212036 A 9/2010
JP 5244264 B1 7/2013
(Continued)

*Primary Examiner* — Olatunji Godo
(74) *Attorney, Agent, or Firm* — Carrier Blackman & Associates, P.C.; Joseph P. Carrier; Fulchand P. Shende

(57) ABSTRACT

A solid oxide fuel cell stack includes a support, a plurality of power generation elements connected in series, each including a fuel electrode, a solid electrolyte, and an air electrode stacked in that order on the support, and an interconnector electrically connecting an air electrode in one of the two adjacent power generation elements to a fuel electrode in the other power generation element. A solid electrolyte for one of the power generation elements is provided on the downside of the interconnector provided on the downside of the air electrode in the one power generation element so that the solid electrolyte is joined to the interconnector, and a solid electrolyte for the other power generation element is provided on the upper side of the interconnector provided on the upper side of the fuel electrode for the other power generation element so that the solid electrolyte is joined to the interconnector.

10 Claims, 8 Drawing Sheets

(30) Foreign Application Priority Data

Mar. 31, 2015 (JP) ................................ 2015-074371
Mar. 31, 2015 (JP) ................................ 2015-074374

(51) Int. Cl.
*H01M 8/1246* (2016.01)
*H01M 8/12* (2016.01)
*H01M 8/1213* (2016.01)
*H01M 8/124* (2016.01)

(52) U.S. Cl.
CPC ........... *H01M 8/1246* (2013.01); *H01M 8/24* (2013.01); *H01M 2008/1293* (2013.01); *H01M 2300/0071* (2013.01)

(56) References Cited

FOREIGN PATENT DOCUMENTS

| | | |
|---|---|---|
| JP | 5613808 B1 | 10/2014 |
| JP | 2015064961 A | 4/2015 |
| JP | 2015065047 A | 4/2015 |

\* cited by examiner

SOLID OXIDE FUEL CELL STACK

FIELD OF INVENTION

The present invention relates to a solid oxide fuel cell stack. More specifically, the present invention relates to a solid oxide fuel cell stack that includes an interconnector that has an excellent electrical conductivity and a gas sealing property.

BACKGROUND ART

Fuel cells are energy converters that, unlike heat engines which go through heat energy and kinetic energy processes, include reacting fuels such as natural gas and hydrogen with oxygen in the air through a solid electrolyte and continuously and directly obtaining electric energy from chemical energy possessed by fuels. Among them, solid oxide fuel cells are fuel cells that operate as cells including a solid oxide (ceramic) as a solid electrolyte, a fuel electrode as a negative electrode, and an air electrode as a positive electrode. Further, solid oxide fuel cells are known as having an advantage that a high energy conversion efficiency can be obtained.

In solid oxide fuel cells, the output per unit cell is so low that power generation is carried out by enhancing output through connection of a plurality of unit cells in series. Members through which adjacent unit cells are electrically connected are called "interconnectors." Interconnectors using ceramics as materials, hereinafter referred to also as "ceramic interconnectors", are known. Gas sealing properties high enough to prevent gas permeation, electrical conductivity, oxide ion insulating properties, and adhesion to solid electrolyte are required as properties of ceramic interconnectors.

In general, a ceramic interconnector cannot provide satisfactory electrical conductivity unless the thickness is small, for example, approximately not more than 100 μm. When an attempt is made to form a ceramic interconnector having a reduced small thickness so as to obtain satisfactory electrical conductivity on a surface of porous electrodes such as fuel electrodes and air electrodes, there is a possibility that the ceramic interconnector is disadvantageously incorporated into the porous electrode. This leads to a disadvantage of a possibility that the ceramic interconnector cannot be formed or a possibility that, even when the ceramic interconnector can be formed, the thickness is so small that satisfactory gas sealing properties cannot be obtained.

When the gas sealing property of a ceramic interconnector is low, the fuel gas is disadvantageously leaked from the fuel electrode side of the ceramic interconnector to the air electrode side, resulting in mixing with air. In order to enhance the gas sealing property of a ceramic interconnector, the denseness of the ceramic interconnector should be increased. To this end, the ceramic interconnector should be densely sintered. When the electrical conductivity of a ceramic interconnector is low, the resistance of the ceramic interconnector is so high that the output of the fuel cell is disadvantageously lowered. Further, when the oxide ion insulating property of a ceramic interconnector is low, the oxide ions are disadvantageously leaked from the air electrode side to the fuel electrode side of the interconnector, leading to a lowered efficiency of the fuel cell. In addition, when the adhesion between the solid electrolyte and the ceramic interconnector is low, disadvantageously, gaps such as cracking occur between the solid electrolyte and the ceramic interconnector, resulting in leakage of the fuel gas through the gaps.

Lanthanum chromite($LaCrO_3$)-based interconnectors have widely been used as materials for ceramic interconnector. It is known that the $LaCrO_3$-based interconnectors have a high electrical conductivity but cannot be sintered without difficulties. Further, since chromium (Cr) is contained, there is a possibility that the so-called Cr poisoning occurs.

Further, SLT-based interconnectors represented by $SrLaTiO_{3-\delta}$ have widely been used as materials for ceramic interconnectors. It is known that the SLT-based interconnectors have lower electrical conductivity but have better sinterability as compared with the $LaCrO_3$-based interconnectors. In the SLT-based interconnectors, for example, the electrical conductivity is developed by replacing Sr site in the crystal lattice of $SrTiO_3$, that is an insulator, with lanthanum (La) to give $SrLaTiO_{3-\delta}$ (SLT), thereby converting a part of $Ti^{4+}$ in Ti site in the crystal lattice of $SrLaTiO_{3-\delta}$ (SLT) to $Ti^{3+}$. $\delta$ is a value that is required to meet a neutral condition of the electric charge.

JP2008-270203A (PTL 1) aims to provide an SLT-based interconnector that simultaneously realizes an improvement in electrical conductivity and an improvement in adhesion to a solid electrolyte while maintaining good airtightness. In order to realize this object, this patent literature describes that the ceramic interconnector has a two-layer structure of an airtightness-oriented portion formed on the fuel electrode side and an electrical conductivity-oriented portion that is formed on the air electrode side and has a higher electrical conductivity than the airtightness-oriented portion. Further, FIG. 2 in this literature shows an embodiment where a part of a solid electrolyte in one power generation element is formed so as to provide under a ceramic interconnector that is in contact with a fuel electrode in one of adjacent power generation elements and an air electrode in the other adjacent power generation element.

JP5244264B (PTL 2) describes the regulation of the amount of iron contained in each of a chromite-based interconnector and an electrically conductive support member from the viewpoint of lowering an electric resistance of a laminate composed of a chromite-based interconnector and an electrically conductive support member (fuel electrode). This regulation reduces resistance between both the materials, improves connectivity, and synergistically promotes densification during co-sintering. Further, FIG. 2 in this literature describes an embodiment where a solid electrolyte is formed on the chromite-based interconnector disposed in contact with the fuel electrode so as to be partially covered on the chromite-based interconnector.

In none of the literatures, however, an improvement in gas sealing property of the interconnector by contact the interconnector with the solid electrolyte is not taken into consideration. Thus, none of the literatures has not realized the manufacture of solid oxide fuel cell stacks including a ceramic interconnector possessing excellent electrical conductivity and gas sealing property.

CITATION LIST

Patent Literature

[PTL 1] JP2010-212036A
[PTL 2] JP5244264B

SUMMARY OF THE INVENTION

The present inventors have now found that the gas sealing property of the interconnector can be improved by joining the interconnector to the solid electrolyte. The present invention has been made based on such finding.

Thus, an object of the present invention is to provide a solid oxide fuel cell stack including a ceramic interconnector that possesses excellent electrical conductivity and gas sealing property.

According to the present invention, there is provided a solid oxide fuel cell stack comprising:
a support,
a plurality of power generation elements, each of which including at least a fuel electrode, a solid electrolyte, and an air electrode stacked in that order on the surface of the support, and
an interconnector that electrically connects an air electrode in one of the two adjacent power generation elements in the plurality of power generation elements to a fuel electrode in the other power generation element, the plurality of power generation elements being connected in series to each other, wherein
a solid electrolyte for one of the power generation elements is provided on the downside of the interconnector provided on the downside of the air electrode in the one power generation element so that the solid electrolyte is joined to the interconnector, and a solid electrolyte for the other power generation element is provided on the upper side of the interconnector provided on the upper side of the fuel electrode for the other power generation element so that the solid electrolyte is joined to the interconnector.

More specifically, the solid oxide fuel cell stack according to the present invention comprises:
a support; and
a plurality of power generation elements provided on a surface of the support, wherein
when adjacent two power generation elements in the plurality of power generation elements are a first power generation element and a second power generation element, respectively,
the first power generation element comprises, as constituent members,
a first fuel electrode,
a first air electrode, and
a first solid electrolyte provided between the first fuel electrode and the first air electrode,
the first fuel electrode being provided between the support and the first air electrode,
the second power generation element comprises, as constituent members,
a second fuel electrode,
a second air electrode, and
a second solid electrolyte provided between the second fuel electrode and the second air electrode,
the second fuel electrode is provided between the support and the second air electrode,
the solid oxide fuel cell stack further comprises an interconnector that electrically connects the first air electrode in the first power generation element to the second fuel electrode in the second power generation element,
the first power generation element is connected in series with the second power generation element through the interconnector,
when a vertical direction from the surface of the support to the first fuel electrode, the first solid electrolyte, and the first air electrode or a vertical direction from the surface of the support to the second fuel electrode, the second solid electrolyte, and the second air electrode is presumed to be a Z axis direction,
the adjacent two power generation elements includes
a first area of the first power generation element, the first area including the second fuel electrode, the first solid electrolyte, and the first air electrode arranged in that order in the Z axis direction,
a second area of the first power generation element, the second area including the first solid electrolyte and the first air electrode arranged in that order in the Z axis direction,
a third area of the second power generation element, the third area including the second fuel electrode and the second solid electrolyte arranged in that order in the Z axis direction,
a fourth area of the first power generation element, the fourth area including the first fuel electrode, the first solid electrolyte, and the first air electrode arranged in that order in the Z axis direction, and
a fifth area of the first power generation element, the fifth area including the second fuel electrode, the interconnector, and the first air electrode arranged in that order in the Z axis direction,
when a direction that is vertical to the Z axis direction and in which oxide ions migrate is presumed to be an X axis direction,
the fourth area, the second area, the first area, the fifth area, and the third area are continuously adjacent in that order in the X axis direction, and
the interconnector includes
a sixth portion provided between the second fuel electrode and the first air electrode in the fifth area,
a first portion provided between the first solid electrolyte and the first air electrode in the second area,
a second portion provided between the first solid electrolyte and the first air electrode in the first area, and
a third portion provided between the second fuel electrode and the second solid electrolyte in the third area.

DESCRIPTION OF THE INVENTION

Definition

The solid oxide fuel cell stack according to the present invention refers to a solid oxide fuel cell stack that, as long as the structure of the interconnector and the structure of the solid electrolyte meet requirements described later, is usually classified or understood as a solid oxide fuel cell stack in the art. The solid oxide fuel cell stack includes a plurality of power generation elements, each including at least the fuel electrode, the solid electrolyte, and the air electrode stacked in that order, and the interconnector that electrically connects an air electrode in one of the two adjacent power generation elements in the plurality of power generation elements to a fuel electrode in the other power generation element. The shape of the solid oxide fuel cell stack according to the present invention is not limited and may be, for example, a cylindrical shape or a hollow plate-like shape with a plurality of gas flow paths formed therein.

The expression "adjacent" or "provided adjacent" as used herein means that a plurality of contemplated elements do not include other contemplated element therebetween that is the same type as the contemplated element. Other elements other than the contemplated elements may be included between the contemplated elements. For example, an additional power generation element is not included between one of the adjacent power generation elements and the other power generation element. However, for example, an interconnector can be included between one of the adjacent power generation elements and the other power generation element.

The solid oxide fuel cell stack according to the present invention refers to a so-called horizontal-striped solid oxide fuel cell. In the present invention, a horizontal-striped solid oxide fuel cell refers to a solid oxide fuel cell including a plurality of power generation elements provided on a surface of one support.

In the present invention, the solid oxide fuel cell stack refers to an assembly of a plurality of power generation elements.

A solid oxide fuel cell system using a solid oxide fuel cell stack according to the present invention is not limited to a specific one, and publicly known manufacturing methods and other materials constituting the solid oxide fuel cell system may be used.

Figure 1A:
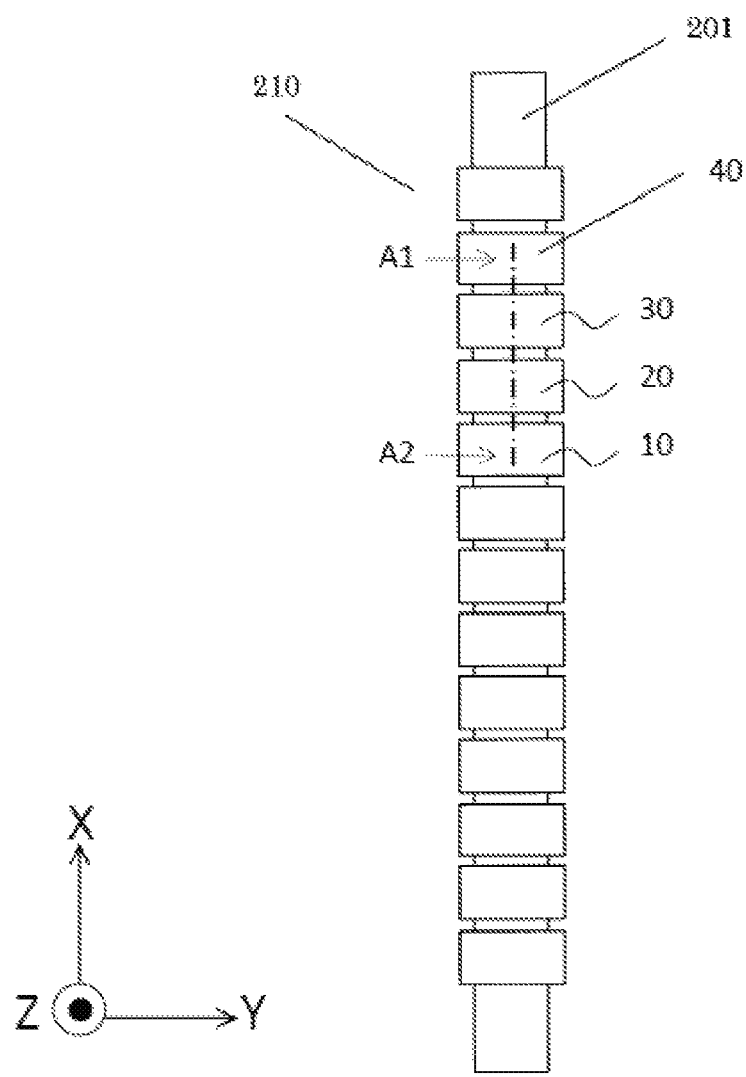
FIG. 1A is a front view of a horizontal-striped solid oxide fuel cell stack according to the present invention.
Figure 1B:
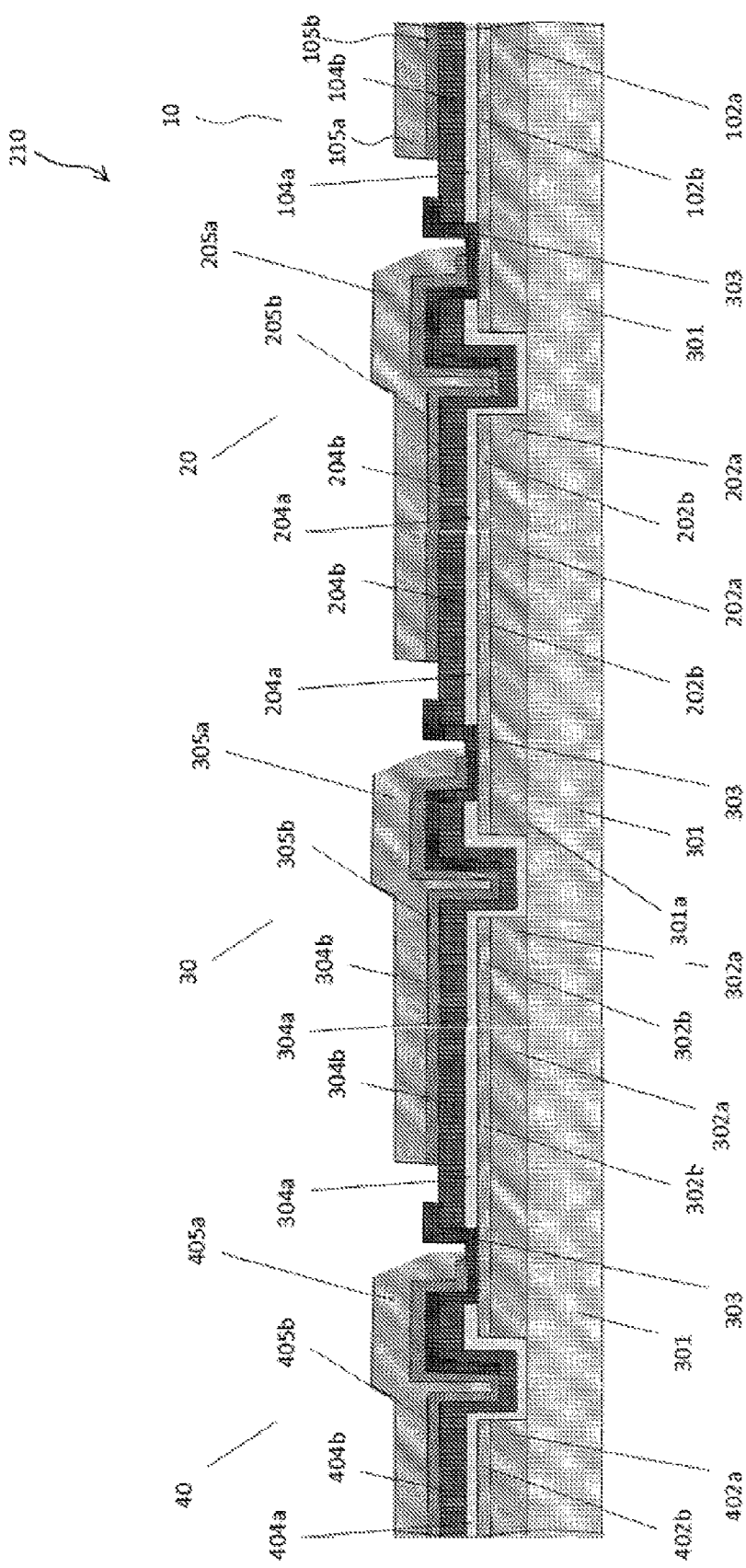
FIG. 1B is a cross-sectional schematic view of four adjacent power generation elements constituting a solid oxide fuel cell stack according to the present invention.

The whole construction and constituent elements of a solid oxide fuel cell stack will be described in reference to FIG. 1A and 1B. FIG. 1A is a front view of a horizontal-striped solid oxide fuel cell stack as one embodiment of the present invention. FIG. 1B is a schematic view illustrating one embodiment of a solid oxide fuel cell stack 210 according to the present invention.

Power Generation Element

As shown in FIGS. 1A and 1B, a solid oxide fuel cell stack 210 according to the present invention includes a plurality of power generation elements (10, 20, 30, 40). These power generation elements (10, 20, 30, 40) are connected in series. Each of the power generation elements (10, 20, 30, 40) is a laminate of a fuel electrode (102, 202, 302, 402), a solid electrolyte (104, 204, 304, 404), and an air electrode (105, 205, 305, 405) stacked in that order.

In the present specification, a vertical direction, a stacking direction, from the surface of a support 301 towards a fuel electrode (102, 202, 302, 402), a solid electrolyte (104, 204, 304, 404), and an air electrode (105, 205, 305, 405) in each power generation element (10, 20, 30, 40) is defined as a Z axis direction. One direction perpendicular to the Z axis direction is defined as an X axis direction, and a direction perpendicular to both the Z axis direction and the X axis direction is defined as a Y axis direction. Here the X axis direction is a direction in which oxide ions move. As illustrated in FIGS. 1A and 1B, in the solid oxide fuel cell stack 210, the plurality of power generation elements (10, 20, 30, 40) are arranged along the X axis direction.

Support

The solid oxide fuel cell stack 210 according to the present invention includes a support 201, 301. A plurality of power generation elements (10, 20, 30, 40) are provided in series on a surface of the support 201, 301. In the present invention, any type of support may be used without particular limitation as long as the support 201, 301 is porous, is permeable to gas, has a mechanical strength high enough to support the plurality of power generation elements (10, 20, 30, 40) and an electrical insulating property. At least one material selected from the group consisting of MgO, calcic-stabilized zirconia (CSZ), and forsterite may be used as materials for the support 201, 301. The thickness of the support 201, 301 is preferably 0.5 to 2 mm.

Inner Electrode and Outer Electrode

In the present invention, fuel electrodes (102, 202, 302, 402) may be inner electrodes or alternatively may be outer electrodes. That is, each of a plurality of the power generation elements (10, 20, 30, 40) may be a laminate including at least a fuel electrode (102, 202, 302, 402) as an inner electrode, a solid electrolyte (104, 204, 304, 404), and an air electrode (105, 205, 305, 405) as an outer electrode stacked on a surface of each other. Alternatively, each of a plurality of the power generation elements (10, 20, 30, 40) may be a laminate including at least an air electrode (105, 205, 305, 405) as an inner electrode, a solid electrolyte (104, 204, 304, 404), and a fuel electrode (102, 202, 302, 402) as an outer electrode stacked on a surface of each other.

In a preferred embodiment of the present invention, the inner electrode is a fuel electrode (102, 202, 302, 402). The reason for this is as follows. Specifically, a porous structure having good gas permeability is adopted in the support 201, 301 and current collecting layers, for example, fuel electrode layers 102a, 202a, 302a, 402a, the fuel electrode layers being described later in more detail. The support 201, 301 holds the structure of the power generation elements (10, 20, 30, 40). Accordingly, the thickness of the support 201, 301 is larger than that of the current collecting layer that is merely required to meet an electrical conductivity requirement.

That is, the support 201, 301 is likely to have a lower permeability to gas than the current collecting layer. Further, a comparison of the diffusion rate of oxygen gas with that of hydrogen gas has revealed that the diffusion rate of hydrogen gas is a few times higher than that of oxygen gas. Thus, when the inner electrode is an air electrode (105, 205, 305, 405), oxygen having a lower permeability than hydrogen is permeated into the support, and, consequently, the gas diffusion overvoltage is larger than that when the inner electrode is a fuel electrode (102, 202, 302, 402). As a result, power generation performance is likely to be lowered. Accordingly, when the inner electrode is the fuel electrode (102, 202, 302, 402), a better power generation performance can be obtained. When the inner electrode is the fuel electrode (102, 202, 302, 402), the outer electrode is the air electrode (105, 205, 305, 405).

Fuel Electrode

In the present invention, the fuel electrode (102, 202, 302, 402) has porosity high enough to be permeable to fuel gas, catalytic activity (electrode activity) high enough to adsorb hydrogen, electrical conductivity, and oxide ion conductivity. The porosity of the fuel electrode (102, 202, 302, 402) may be smaller than that of the support 201, 301.

For example, NiO/zirconium-containing oxides and NiO/cerium-containing oxides may be mentioned as materials for constituting the fuel electrode (102, 202, 302, 402), and at least any one of these materials is contained in the fuel electrode (102, 202, 302, 402). Here the NiO/zirconium-containing oxide refers to a homogeneous mixture of NiO and the zirconium-containing oxide at a predetermined ratio. The NiO/cerium-containing oxide refers to a homogeneous mixture of NiO and a cerium-containing oxide at a predetermined ratio. Zirconium-containing oxides of NiO/zirconium-containing oxides include, for example, zirconium-containing oxides doped with one or more of CaO, $Y_2O_3$, and $Sc_2O_3$. Cerium-containing oxides of NiO/cerium-containing oxides include compounds of general formula $Ce_{1-y}Ln_yO_2$ wherein Ln is one or more elements selected from La, Pr, Nd, Sm, Eu, Gd, Tb, Dy, Ho, Er, Tm, Yb, Lu, Sc, and Y; and $0.05 \leq y \leq 0.50$. NiO is reduced under a fuel atmosphere to Ni, and, thus, the oxides are converted to Ni/zirconium-containing oxides or Ni/cerium-containing oxides.

In the present invention, the fuel electrode (102, 202, 302, 402) may have a single-layer structure or a multi-layer structure. An example of the fuel electrode (102, 202, 302, 402) having a multi-layer structure as the inner electrode is a fuel electrode comprising a layer of Ni/YSZ, YSZ being yttria-stabilized zirconia, that is, a fuel electrode layer (102a, 202a, 302a, 402a) on the support side and a layer of Ni/GDC, GDC being $Gd_2O_3$-$CeO_2$, that is, a fuel electrode catalyst layer (102b, 202b, 302b, 402b) on the solid electrolyte side. The thickness of the fuel electrode (102, 202, 302, 402), that is, the total of the thickness of the fuel electrode layer and the thickness of the fuel electrode catalyst layer is preferably 10 to 200 μm. In this case, the thickness of the fuel electrode catalyst layer (102b, 202b, 302b, 402b) is preferably 0 to 30 μm.

Air Electrode

In the present invention, the air electrode (105, 205, 305, 405) has porosity high enough to be permeable to oxygen, catalytic activity, i.e., electrode activity, high enough to adsorb oxygen or to ionize oxygen, electrical conductivity, and oxide ion conductivity. The porosity and electrical conductivity of the air electrode (105, 205, 305, 405) each may be lower than those of the current collecting layer.

Materials that constitute air electrodes (105, 205, 305, 405) include, for example, lanthanum cobalt-based oxides such as $La_{1-x}Sr_xCoO_3$ wherein x=0.1 to 0.3, and $LaCo_{1-x}Ni_xO_3$ wherein x=0.1 to 0.6, and lanthanum ferrite-based oxides that are solid solutions composed of $LaSrFeO_3$-based compounds and $LaSrCoO_3$-based compounds such as $La_{1-m}Sr_mCo_{1-n}Fe_nO_3$ wherein $0.05<m<0.50$ and $0<n<1$. The air electrode (105, 205, 305, 405) may have a single-layer structure or a multi-layered structure. An example of an outer electrode that is an air electrode (105, 205, 305, 405) having a multi-layered structure is $La_{0.6}Sr_{0.4}CO_{0.2}Fe_{0.8}O_3$, that is, an air electrode catalyst layer 105b, 205b, 305b, 405b on the solid electrolyte side, and $La_{0.6}Sr_{0.4}CO_{0.8}Fe_{0.2}O_3$, that is, an air electrode layer 105a, 205a, 305a, 405a, on the uppermost layer. The thickness of the air electrode, that is, the total of the thickness of the air electrode layer and the thickness of the air electrode catalyst layer, is preferably 0.2 to 30 μm.

Solid Electrolyte

In the present invention, the solid electrolyte (104, 204, 304, 404) has oxide ion conductivity, gas sealing property, and electrical insulating property. Materials that constitute the solid electrolyte (104, 204, 304, 404) include lanthanum gallate-based oxides and stabilized zirconia with one or more elements selected from Y, Ca, and Sc dissolved in solid solution as solid solution species. In the present invention, suitable solid electrolytes (104, 204, 304, 404) include lanthanum gallate-based oxides (LSGMs) doped with Sr and Mg, more preferably lanthanum gallate-based oxides (LSGMs) represented by general formula $La_{1-a}Sr_aGa_{1-b-c}Mg_{b-c}Co_cO_{3-\delta}$ wherein $0.05 \leq a \leq 0.3$, $0<b<0.3$, and $0 \leq c \leq 0.15$; and δ is a value that is determined so as to meet charge neutralization conditions. LSGM develops oxide ion conductivity, LSGM including $LaGaO_3$ as a base, La sites having been replaced with Sr. The solid electrolyte (104, 204, 304, 404) may have a single-layer structure or a multi-layered structure. When the solid electrolyte (104, 204, 304, 404) has a multi-layered structure, for example, a reaction inhibitory layer (104a, 204a, 304a, 404a) may be provided between the fuel electrode (102, 202, 302, 402) and the solid electrolyte layer (104b, 204b, 304b, 404b) formed of LSGM. Ceria with La dissolved in solid solution ($Ce_{1-x}La_xO_2$ wherein $0.3<x<0.5$), preferably $Ce_{0.6}La_{0.4}O_2$, may be mentioned as a specific example of the reaction inhibitory layer (104a, 204a, 304a, 404a). The thickness of the solid electrolyte (104, 204, 304, 404), that is, the total thickness of the solid electrolyte layer and the reaction inhibitory layer is preferably 5 to 60 μm. The thickness of the reaction inhibitory layer (104a, 204a, 304a, 404a) is preferably 0 to 20 μm.

Current Collecting Layer

The solid oxide fuel cell stack according to the present invention includes a current collecting layer that electrically connects the outer electrode to the interconnector. The current collecting layer has gas (oxygen) permeability and electrical conductivity high enough to realize smooth flow of electrons produced by the air electrode. In the present invention, when the outer electrode is an air electrode, the current collecting layer can be formed by baking an electrically conductive paste containing a noble metal such as Ag or Pt or a paste containing an electrically conductive oxide such as $La_{0.6}Sr_{0.4}Co_{0.8}Fe_{0.2}O_{3-\delta}$. When the outer electrode is a fuel electrode, the current collecting layer can be formed by baking a paste containing NiO or oxides of metals such as Ni that, when reduced, develop electrical conductivity, or metals. Preferably, the current collecting layer has a porous or mesh structure from the viewpoint of providing gas permeability. The thickness of the current collecting layer is preferably 10 to 200 μm.

Interconnector

Composition

In the present invention, an interconnector 303 is formed of ceramic. That is, in the present invention, the interconnector 303 refers to a ceramic interconnector. Preferably, the ceramic material is formed of a perovskite oxide represented by general formula $Sr_xLa_yTiO_{3-\delta}$ wherein x and y are a positive real number that meets $0.8 \leq x+y \leq 1.0$ and $0.01<y \leq 0.1$. Here "formed of" means that the main component of the interconnector 303 is a perovskite oxide represented by the general formula $Sr_xLa_yTiO_{3-\delta}$. That is, an embodiment where the interconnector 303 contains other components, for example, diffusion elements described later is not excluded. In other words, preferably, the interconnector 303 contains as a main component a perovskite oxide represented by the general formula $Sr_xLa_yTiO_{3-\delta}$. The main component means that, in the interconnector 303, the content of the perovskite oxide represented by the general formula $Sr_xLa_yTiO_{3-\delta}$ is not less than 80% by mole, preferably not less than 90% by mole, more preferably not less than 95% by mole. Still more preferably, the interconnector 303 consists of the perovskite oxide only. When the main component of the interconnector 303 is an oxide having the above composition ratio, satisfactory denseness and electrical conductivity can be simultaneously realized. The interconnector 303 develops electrical conductivity when the interconnector 303 includes $SrTiO_3$ as a base with La replaced. In a preferred embodiment of the present invention, the composition ratio between Sr and La meets $0.8 \leq x+y \leq 0.9$, $0.01 < y \leq 0.1$. When this requirement is met, the denseness is further enhanced. Further, Ti can be replaced with Nb. This can further enhance the electrical conductivity. Specific examples of such oxides preferably include $Sr_x La_y Ti_{1-z}Nb_zO_{3-\delta}$ wherein $0.8 \leq x+y \leq 1.0$, $0.01 < y \leq 0.1$, and $0.05 \leq z \leq 0.2$.

In the present invention, the interconnector 303 may contain, as unavoidable components, elements that are, for example, in firing, diffused into the interconnector 303 from other members, that is, for example, the fuel electrode (102, 202, 302, 402), the air electrode (105, 205, 305, 405), and the solid electrolyte (104, 204, 304, 404). Such elements include, for example, Ni, Y, Gd, Ce, Zr, La, Sr, Ga, Mg, Co, and Fe. The amount of elements diffused may vary depending, for example, upon constituent materials for each member, crystal structure, firing temperature, and mode of firing, for example, successive firing or co-firing.

Thickness

In the present invention, the thickness of the interconnector 303 is preferably 5 µm to 50 µm. The thickness of the interconnector 303 will be described later in more detail.

Electric Conductivity

In the present invention, the electrical conductivity of the interconnector 303 is preferably not less than 0.01 S/cm, more preferably not less than 0.02 S/cm under an atmospheric environment at 700° C. Further, the higher the electrical conductivity, the better the results. Therefore, there is no upper limit on the electrical conductivity. Preferably, however, the electrical conductivity is not more than 0.16 S/cm. When this requirement is met, the interconnector 303 can be improved and the power generation output of the solid oxide fuel cell stack 210 can be improved.

The electrical conductivity can be measured by the following method. Specifically, specimens for the measurement of electrical conductivity can be prepared by subjecting a raw material powder for the interconnector to uniaxial pressing under a load of 900 kgf/cm² and firing the pressed product at 1300° C. for 2 hours under an atmospheric environment. The electrical conductivity of the specimens is measured by a direct current four-terminal method based on JIS (Japanese Industrial Standards) R 1650-2 under an atmospheric environment at 700° C.

Porosity

In the present invention, the porosity of the interconnector 303 is preferably not more than 1%, more preferably not more than 0.1%. The porosity is preferably not less than 0%. When this requirement is met, the gas sealing property of the interconnector 303 can be ensured and, at the same time, the power generation efficiency of the solid oxide fuel cell stack 210 can be improved. The porosity can be measured by the following method.

Method of Obtaining Porosity from SEM Image

An SEM image is obtained by cutting out a specimen so as to include an interconnector from the solid oxide fuel cell stack and observing the inerconnector with a scanning electron microscope (for example, S-4100 manufactured by Hitachi, Ltd.) under conditions of an accelerated voltage of 15 kV, a secondary electron image, and a magnification of 100 to 10000 times. The SEM image is evaluated by a software for image processing (for example, Winroofver 6.5.1 manufactured by MITANI CORPORATION). As a result, a histogram including a brightness as abscissa and an appearance frequency as ordinate is obtained. In this histogram, an area where the brightness is lower than the average of the minimum and the maximum of the brightness is regarded as a low-brightness area while an area where the brightness is higher than the average is regarded as a high-brightness area. The low-brightness area is determined as pores and the high-brightness area other than the pores is determined as the interconnector for binarization processing. Thereafter, the porosity is obtained by the following equation.

Porosity (%)=Value of integral in low-brightness area÷Value of integral of appearance frequency of whole×100

In the present invention, in order to confirm that the interconnector 303 has a desired porosity obtained by the above method, the porosity determined by the following method can be used as one index.

Method of Obtaining Porosity by Archimedes Method

Specimens are obtained by subjecting a raw material powder for the interconnector to uniaxial pressing under a load of 900 kgf/cm² and firing the pressed product at 1300° C. for 2 hours under an atmospheric environment. For the specimens, the porosity is measured by an Archimedes method according to JIS R 1634.

In the present invention, preferably, both the solid electrolyte (104, 204, 304, 404) and the interconnector 303 contain strontium. In the present invention, more preferably, the amount of strontium contained in the interconnector 303 is larger than that of strontium contained in the solid electrolyte (104, 204, 304, 404). That is, more preferably, the amount of strontium contained in the solid electrolyte (104, 204, 304, 404) is smaller than that of strontium contained in the interconnector 303.

In the interconnector 303, the content of strontium in the composition is preferably 30% by mole or more to 50% by mole or less in terms of element except for oxygen. Specifically, in $Sr_xLa_yTiO_{3-\delta}$ wherein x and y are a positive real number that meets $0.8 \leq x+y \leq 1.0$ and $0.01 < y \leq 0.1$, a requirement of $0.3 \leq x/(x+y+1) \leq 0.5$ is further preferably met. Preferably, the solid electrolyte (104, 204, 304, 404) contains not more than 15% by mole, more preferably 2.5% by mole or more to 15% by mole or less of strontium in the composition in terms of element excluding oxygen. Preferably, the solid electrolyte (104, 204, 304, 404) includes lanthanum gallate-based oxides (LSGMs) represented by general formula $La_{1-a}Sr_aGa_{1-b-c}Mg_bCo_cO_{3-\delta}$ wherein $0.05 \leq a \leq 0.3$, $0 < b < 0.3$, and $0 \leq c \leq 0.15$; and $\delta$ is a value that is determined so as to meet charge neutralization conditions.

Structure of Solid Oxide Fuel Cell Stack

With reference to FIG. 1A and FIG. 1B, the structure of the solid oxide fuel cell stack is further described. As illustrated in FIG. 1A, a horizontal-striped solid oxide fuel cell stack 210 includes 13 power generation elements connected in series on a support 201. Power generation elements 10, 20, 30, and 40 are four power generation elements continuously adjacent to each other.

FIG. 1B illustrates four adjacent power generation elements 10, 20, 30, 40 in a solid oxide fuel cell stack 210. The solid oxide fuel cell stack 210 in FIG. 1B is of a type in which the inner electrode is a fuel electrode 102, 202, 302, 402. The solid oxide fuel cell stack 210 includes a support 301, first/second fuel electrode, that is, fuel electrode layers 102a, 202a, 302a, 402a, and fuel electrode catalyst layers 102b, 202b, 302b, 402b, first/second solid electrolytes, that is, reaction inhibitory layers 104a, 204a, 304a, 404a, and solid electrolyte layers 104b, 204b, 304b, 404b, air electrodes 105b, 205b, 305b, 405b, current collecting layers 105a, 205a, 305a, 405a, and an interconnector 303. Here, first/second means that the structure is a single-layer or two-layer structure and, in two layers, has a first layer and a second layer.

Figure 2:
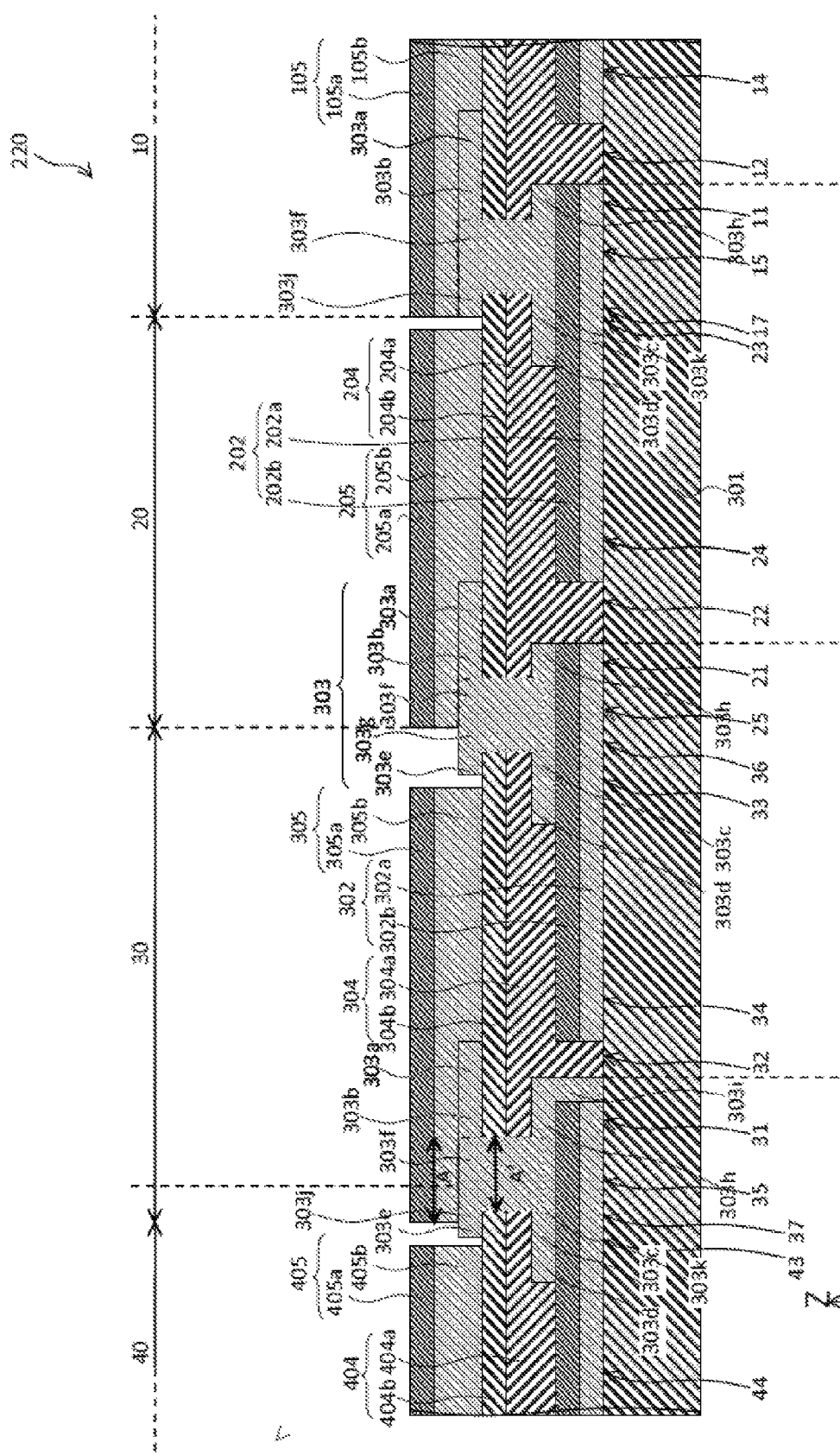
FIG. 2 is a cross-sectional schematic view of four adjacent power generation elements constituting a solid oxide fuel cell stack according to the present invention.

FIG. 2 is a schematic view of one embodiment of the solid oxide fuel cell stack 220 according to the present invention. In the solid oxide fuel cell stack 220, four adjacent power generation elements (10, 20, 30, 40) are included. The solid oxide fuel cell stack 220 includes a support 301 and four power generation elements (10, 20, 30, 40) provided on a surface of the support 301. When two adjacent power generation elements in the four power generation elements are a first power generation element 20 and a second power generation element 30, the first power generation element 20 includes, as constituent members, a first fuel electrode 202, a first air electrode 205, and a first solid electrolyte 204 provided between the first fuel electrode 202 and the first air electrode 205. The first fuel electrode 202 is arranged between the support 301 and the first air electrode 205. The second power generation element 30 includes, as constituent members, a second fuel electrode 302, a second air electrode 305, and a second solid electrolyte 304 provided between the second fuel electrode 302 and the second air electrode 305. The second fuel electrode 302 is arranged between the support 301 and the second air electrode 305.

The solid oxide fuel cell stack 220 further includes an interconnector 303 that electrically connects the first air electrode 205 in the first power generation element 20 to the second fuel electrode 302 in the second power generation element 30. The first power generation element 20 and the second power generation element 30 are connected in series through the interconnector 303.

In the solid oxide fuel cell stack 220, from the surface of the support 301, the first fuel electrode 202, the first solid electrolyte 204, and the first air electrode 205, or the second fuel electrode 302, the second solid electrolyte 304, and the second air electrode 305 are arranged in Z axis direction.

Each Area in Power Generation Element

For example, in a first area 21 in the first power generation element 20, the second fuel electrode 302, the first solid electrolyte 204, and the first air electrode 205 are arranged in that order in Z axis direction. In a second area 22 in the first power generation element 20, the first solid electrolyte 204 and the first air electrode 205 are arranged in that order in Z axis direction. In a third area 23 in the first power generation element 20, the first fuel electrode 202 and the first solid electrolyte 204 are arranged in that order in Z axis direction. In a fourth area 24 in the first power generation element 20, the first fuel electrode 202, the first solid electrolyte 204, and the first air electrode 205 are arranged in that order in Z axis direction. In a fifth area 25 in the first power generation element 20, the second fuel electrode 302 and the first air electrode 205 are arranged in that order in Z axis direction. The first area 21 includes a constituent member in the first power generation element 20 and a constituent member in the second power generation element 30. The second area 22 and the third area 23 consist of only a constituent member in the first power generation element 20. The fourth area 24 includes all constituent members in the first power generation element 20. That is, in the fourth area 24, the first fuel electrode 202, the first solid electrolyte 204, and the first air electrode 205 are arranged in that order in Z axis direction. The fourth area 24 functions as a power generation unit in the first power generation element 20. In the fifth area 25, the first power generation element 20 (first air electrode 205) and the second power generation element 30 (second fuel electrode 302) are connected in series through an interconnector 303 that will be described later.

Likewise, a first area 31 in the second power generation element 30, a third fuel electrode 402, a second solid electrolyte 304, and a second air electrode 305 are arranged in that order in Z axis direction. In a second area 32 in the second power generation element 30, the second solid electrolyte 304 and the second air electrode 305 are arranged in that order in Z axis direction. In a third area 33 in the second power generation element 30, the second fuel electrode 302 and the second solid electrolyte 304 are arranged in that order in Z axis direction. In a fourth area 34 in the second power generation element 30, the second fuel electrode 302, the second solid electrolyte 304, and the second air electrode 305 are arranged in that order in Z axis direction. In a fifth area 35 in the second power generation element 30, the third fuel electrode 402 and the second air electrode 305 are arranged in that order in Z axis direction. Also in the second power generation element 30, the fourth area 34 functions as a power generation unit in the second power generation element 30. In the fifth area 35, the second power generation element 30 (second air electrode 305) and the third power generation element 40 (third fuel electrode 402) are connected in series through the interconnector 303 described later.

The second power generation element 30 may further include a sixth area 36 and/or a seventh area 37. In the sixth area 36, only the second fuel electrode 302 is arranged on the support 301 in Z axis direction. In the seventh area 37, the second fuel electrode 302, the second solid electrolyte 304, and the first air electrode 205 are arranged in that order in Z axis direction.

In the first power generation element 20, the third area 23, the fourth area 24, the second area 22, the first area 21, and the fifth area 25 are arranged in that order in X axis direction. In the second power generation element 30, the third area 33, the fourth area 34, the second area 32, the first area 31, and the fifth area 35 are arranged in that order in X axis direction. A fourth area 24, a second area 22, a first area 21, and a fifth area 25 in the first power generation element 20 and a third area 33 in the second power generation element 30 are arranged in X axis direction between the first power generation element 20 and the second power generation element 30.

As illustrated in FIG. 2, the solid oxide fuel cell stack 220 may further include a sixth area and/or a seventh area. In this example, in an area between the first power generation element 20 and the power generation element 30, a sixth area 36 in the second power generation element 30 is further arranged between the fifth area 25 in the first power generation element 20 and the third area 33 in the second power generation element 30. Further, in this example, a seventh area 37 in the second power generation element 30 is further arranged between a fifth area 35 in the second power generation element 30 and a third area 43 in the third power generation element 40 in an area between the second power generation element 30 and the third power generation element 40.

That is, in an area between two adjacent power generation elements, for example, between the first power generation element 20 and the second power generation element 30, since the extension of the first air electrode 205 in the X axis direction is small, an area (a sixth area 36) is formed in which only the second fuel electrode 302 in the second power generation element 30 is provided on the support 301. On the other hand, in an area between two adjacent power generation elements, for example, between the second power generation element 30 and the third power generation element 40, the second air electrode 305 is extended in the X axis direction so that, in projection to a plane perpendicular to Z axis direction, the second air electrode 305 partially overlaps with the third solid electrolyte 404. The extended portion of the second air electrode 305 is stacked on the third solid electrolyte 404 and the third fuel electrode 402 in Z axis direction to form a seventh area 37.

Each Portion of Interconnector

In the solid oxide fuel cell stack 220, the interconnector 303 includes a first portion 303a, a second portion 303b, a third portion 303c, and a sixth portion 303f. The interconnector 303 may further includes an eighth portion 303h. The interconnector 303 may further includes a fifth portion 303e. The interconnector 303 may further includes a tenth portion 303j or a seventh portion 303g. FIG. 2 illustrates an example of the interconnector 303 further including a fourth portion 303d, a ninth portion 303i, and an eleventh portion 303k.

The portions mentioned above of the interconnector 303 will be described with reference to FIG. 2. At the outset, an interconnector 303 provided between two adjacent power generation elements, that is, between a first power generation element 20 and a second power generation element 30 (in X axis direction), will be described as an example. A sixth portion 303f in the interconnector 303 is provided, for example, between the second fuel electrode 302 and the first air electrode 205 in the fifth area 25 in the first power generation element 20. A first portion 303a in the interconnector 303 is provided, for example, between the first solid electrolyte 204 and the first air electrode 205 in the second area 22 in the first power generation element 20. A second portion 303b in the interconnector 303 is provided, for example, between the first solid electrolyte 204 and the first air electrode 205 in the first area 21 in the first power generation element 20. A third portion 303c in the interconnector 303 is provided, for example, between the second fuel electrode 302 and the second solid electrolyte 304 in the third area 33 in the second power generation element 30. The thickness of the interconnector as used herein refers to a length of the sixth portion 303f along the Z axis.

The sixth portion 303f electrically connects, for example, the first air electrode 205 to the second fuel electrode 302. That is, in the interconnector 303, two adjacent power generation elements, for example, the first power generation element 20 and the second power generation element 30, are connected in series through the sixth portion 303f. On the other hand, the first portion 303a and the second portion 303b are provided, for example, between the first solid electrolyte 204 and the first air electrode 205 and joined to the first solid electrolyte 204. The third portion 303c is arranged, for example, between the second fuel electrode 302 and the second solid electrolyte 304 and joined to the second solid electrolyte 304. Specifically, the interconnector 303 has a first portion 303a, a second portion 303b, and a third portion 303c that are joined to the solid electrode (204,304), and, thus, the gas sealing property of the interconnector 303 can be enhanced by taking advantage of the gas sealing property of the solid electrolyte. The junction or joining as used herein refers to an arrangement of two constituent members in direct close contact with each other without any gap.

As described above, in the solid oxide fuel cell stack 220, the interconnector 303 has a first portion 303a and a second portion 303b that are joined to the first solid electrolyte 204, and a third portion 303c that is joined to the second solid electrolyte 304, leading to excellent gas sealing properties.

As illustrated in FIG. 2, preferably, the interconnector 303 may further include an eighth portion 303h provided between the second fuel electrode 302 and the first solid electrolyte 204 in the first area 21 in the first power generation element 20. The eighth portion 303h is further provided in junction with the first solid electrolyte 204 in the first power generation element 20, the eighth portion 303h being provided on the downside of the first solid electrolyte 204 in the first power generation element 20, the first solid electrolyte 204 being provided on the downside of the first air electrode 205 in the first power generation element 20 and on the downside of the interconnector (303a, 303b). That is, the two adjacent power generation elements (20, 30) include a first area 21 where the second fuel electrode 302, the eighth portion 303h in the interconnector, the first solid electrolyte 204, the second portion 303b in the interconnector, and the first air electrode 205 are arranged in that order in Z axis direction, and a second area 22 where the first solid electrolyte 204, the first portion 303a in the interconnector, and the first air electrode 205 are arranged in that order in Z axis direction. The eighth portion 303h is joined to the first solid electrolyte 204. Since the interconnector 303 has the eighth portion 303h, the interconnector 303 has further enhanced gas sealing properties.

In a preferred embodiment of the present invention, the interconnector 303 may include a fifth portion 303e. Although any specific illustration is not found in FIG. 2, in a part of the third area 33 in the second power generation element 30 in X axis direction, the interconnector 303 may further include, on the second solid electrolyte 304, a fifth portion 303e provided adjacent to the sixth portion 303f provided in the fifth area 25 in X axis direction. The fifth portion 303e joined to the second solid electrolyte 304 in the second power generation element 30 is further provided on the second solid electrolyte 304 in the second power generation element 30, the second solid electrolyte 304 being provided on the second fuel electrode 302 in the second power generation element 30 and on the interconnector 303c. That is, a part of the two adjacent power generation elements (20, 30) in X axis direction includes a third area 33 in the second power generation element 30 where the second fuel electrode 302, the third portion 303c in the interconnector, the second solid electrolyte 304, and the fifth portion 303e in the interconnector are arranged in Z axis direction. In the third area 33, the fifth portion 303e is provided on the second solid electrolyte 304 and joined to the second solid electrolyte 304. Since the interconnector 303 has the fifth portion 303e, the gas sealing property of the interconnector 303 can be further enhanced. The fifth portion 303e is provided while providing spacing from the second air electrode 305 in X axis direction. By virtue of this construction, electrical connection between adjacent air electrodes, for example, the first air electrode 205 and the second air electrode 305, can be suppressed.

In a preferred embodiment of the present invention, the interconnector 303 may include a tenth portion 303j. As illustrated in FIG. 2, two adjacent power generation elements, for example, 30, 40, further include a seventh area 37 in the third power generation element 40 where the third fuel electrode 402, the third solid electrolyte 404, and the second air electrode 305 are arranged in that order in Z axis direction. In the seventh area 37, the interconnector 303 may further include a tenth portion 303j provided adjacent in X axis direction to the sixth portion 303f provided in the fifth area between the third solid electrolyte 404 and the second air electrode 305. By virtue of this construction, the surface of the interconnector can be covered with the second air electrode 305, and, consequently, the electrically conductive area of the interconnector can be increased, contributing to enhanced electrical conductivity thereof. Further, the distance between the two adjacent power generation elements (30, 40) can be reduced, leading to a lowered resistance between the power generation elements. In the solid oxide fuel cell stack 220, the tenth portion 303j is joined to the third solid electrolyte 404 in the third power generation element 40 in the seventh area 37 in the third power generation element 40. Since the interconnector 303 has a tenth portion 303j, the gas sealing property of the interconnector 303 can be further enhanced.

In a preferred embodiment of the present invention, the interconnector 303 may include a seventh portion 303g. As illustrated in FIG. 2, the two adjacent power generation elements (for example, 20, 30) further include a sixth area 36 in the second power generation element 30 where only the second fuel electrode 302 is arranged in Z axis direction. In the sixth area 36, the interconnector 303 may further include, on the second fuel electrode 302, a seventh portion 303g provided adjacent in X axis direction to the sixth portion 303f provided in the fifth area. For example, in the sixth area 36 in the second power generation element 30, the seventh portion 303g is provided on the second fuel electrode 302 in the second power generation element 30. By virtue of this construction, the continuity of the sites in the interconnector 303 can be ensured.

The interconnector 303 may include, for example, a ninth portion 303i and an eleventh portion 303k. As illustrated in FIG. 2, for example, in the second area 32 in the second power generation element 30, the interconnector 303 may further include a ninth portion 303i provided between the support 301 and the second solid electrolyte 304 in Z axis direction and between the second solid electrolyte 304; and the third fuel electrode 402 and the eighth portion 303h in the interconnector in X axis direction. The ninth portion 303i is joined to the second solid electrolyte 304. In the seventh area 37 in the second power generation element 30, the interconnector 303 may include an eleventh portion 303k provided between the third fuel electrode 402 and the third solid electrolyte 404. The eleventh portion 303k is joined to the third solid electrolyte 404. Since the interconnector 303 has the ninth portion 303i or the eleventh portion 303k, the gas sealing property of the interconnector 303 can be further enhanced.

FIG. 2 illustrates an example where the interconnector further includes a fourth portion 303d. In the fourth area 44 in the third power generation element 40 where the third fuel electrode 402, the third solid electrolyte 404, and the third air electrode 405 are arranged in that order in Z axis direction, the fourth portion 303d is provided between the third fuel electrode 402 and the third solid electrolyte 404. The fourth portion 303d is provided adjacent in X axis direction to the third portion 303c. The fourth portion 303d is joined to the third solid electrolyte 404. Since the interconnector 303 has the fourth portion 303d, the gas sealing property of the interconnector 303 can be further enhanced. On the other hand, the fourth area (14, 24, 34, 44) in the power generation element (10, 20, 30, 40) is an area that contributes to power generation. Accordingly, an embodiment where the fourth portion 303d is not provided may also be adopted from the viewpoint of power generation efficiency.

Figure 3:
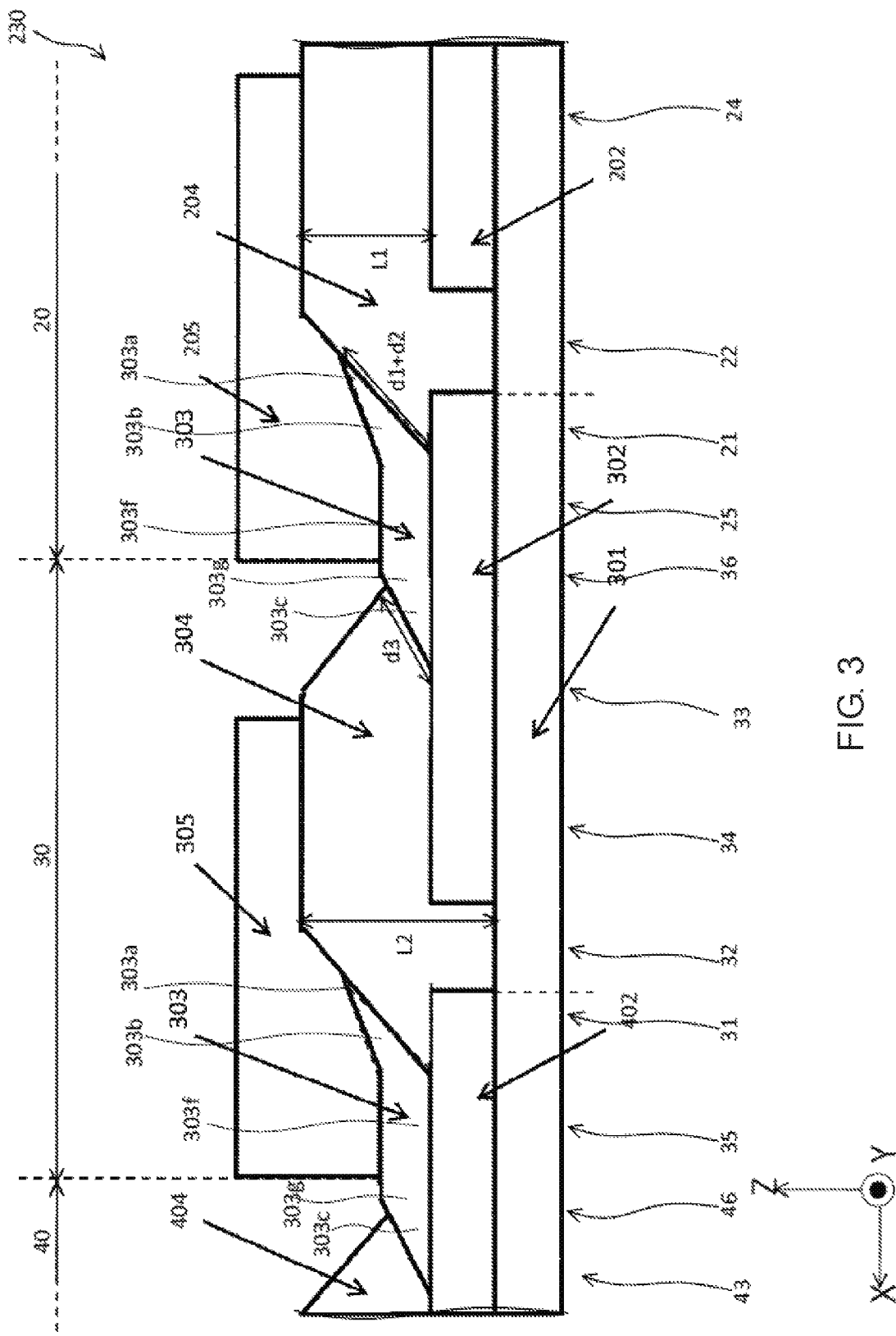
FIG. 3 is a cross-sectional schematic view illustrating a preferred embodiment where three adjacent power generation elements constituting a solid oxide fuel cell stack according to the present invention are included.

FIG. 3 is a cross-sectional schematic view illustrating a preferred embodiment including three adjacent power generation elements (20, 30, 40) that constitute the solid oxide fuel cell stack 230 according to the present invention. FIG. 3 illustrates a solid oxide fuel cell stack including: a support 301; and three power generation elements (20, 30, 40) including fuel electrodes (202, 302, 402), solid electrolytes (204, 304, 404), and air electrodes (205, 305, 405) successively stacked on a surface of the support 301, wherein, in the first power generation element 20 and the second power generation element 30 among these three adjacent power generation elements, a first air electrode 205 is electrically connected to a second fuel electrode 302 through an interconnector 303, and, in the second power generation element 30 and the third power generation element 40, a second air electrode 305 is electrically connected to a third fuel electrode 402 through an interconnector 303, the three adjacent power generation elements 20, 30, 40 being connected in series.

The first solid electrolyte 204 in the first power generation element 20 is provided on the downside of the interconnector (303a, 303b) provided on the downside of the first air electrode 205 in the first power generation element 20 in such a manner that the first solid electrolyte 204 is joined to the interconnector (303a, 303b). Further, the second solid electrolyte 304 in the second power generation element 30 is provided on the upper side of the interconnector 303c provided on the second fuel electrode 302 in the second power generation element 30 in such a manner that the second solid electrolyte 304 is joined to the interconnector 303c. When FIG. 3 is viewed from the first air electrode 205 side of the first power generation element 20, a dense first solid electrolyte 204 is provided on the downside of the interconnector (303a, 303b). When FIG. 3 is viewed from the second fuel electrode 302 side of the second power generation element 30, a dense second solid electrolyte 304 is provided on the upper side of the interconnector 303c. Accordingly, the gas sealing property of the interconnector 303 can be well ensured.

Figure 4:
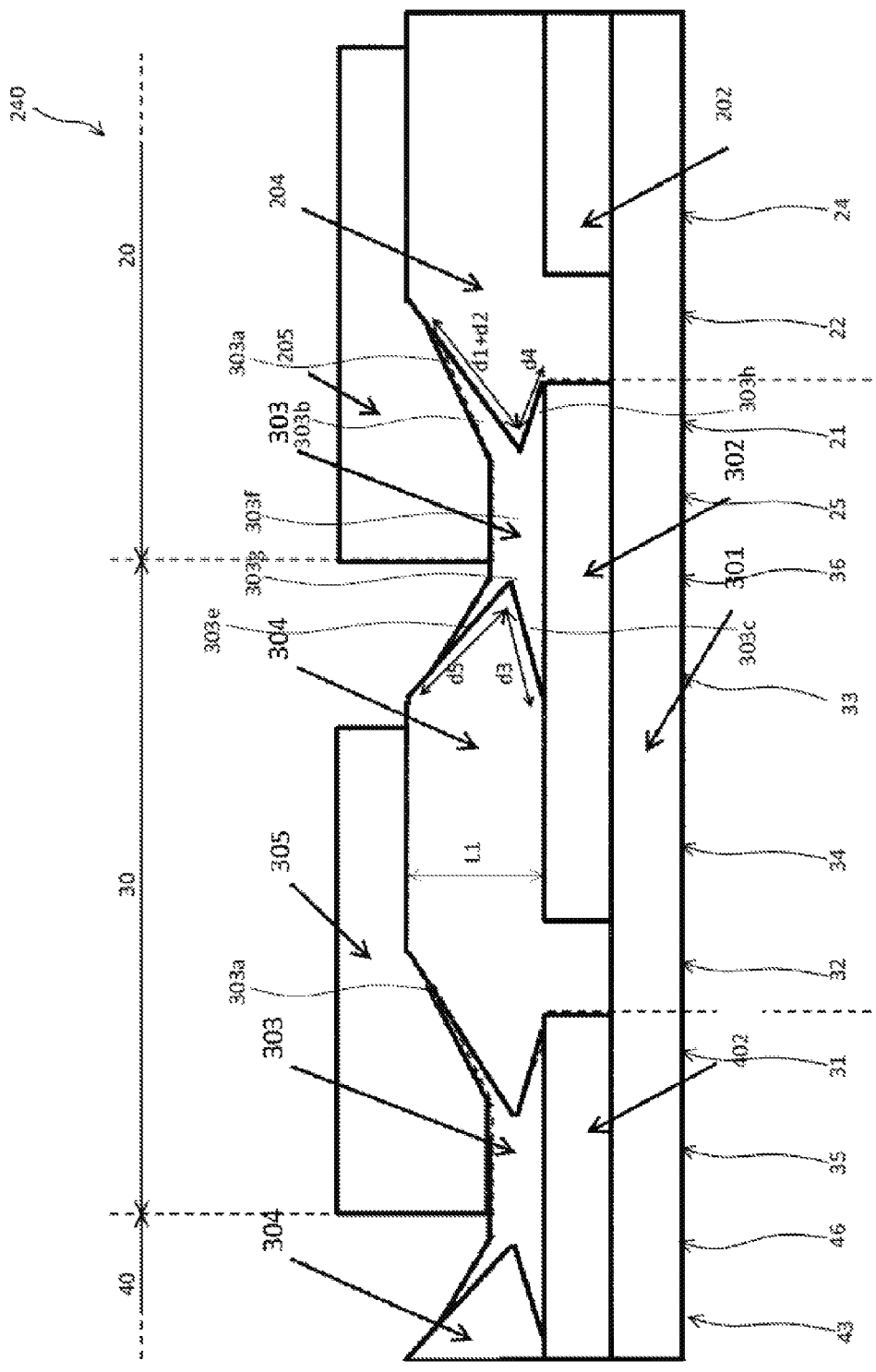
FIG. 4 is a cross-sectional schematic view illustrating another preferred embodiment where three adjacent power generation elements constituting a solid oxide fuel cell stack according to the present invention are included.

FIG. 4 is a cross-sectional schematic view of another preferred embodiment including three adjacent power generation elements (20, 30, 40) that constitute the solid oxide fuel cell stack 240 according to the present invention. In FIG. 4, an interconnector 303h is further provided on the downside of the first solid electrolyte 204 in the first power generation element 20 provided on the downside of the first air electrode 205 in the first power generation element 20 and on the downside of the interconnector (303a, 303b) in such a manner that the interconnector 303h is joined to the first solid electrolyte 204 in the first power generation element 20.

FIG. 4 illustrates an embodiment where an interconnector 303e is further provided on the upper side of the second solid electrolyte 304 in the second power generation element 30 provided on the upper side of the second fuel electrode 302 in the second power generation element 30 and the interconnector 303c in such a manner that the inter connector 303e is joined to the second solid electrolyte 304 in the second power generation element 30.

When FIG. 4 is viewed from the first air electrode 205 side of the first power generation element 20, a dense first solid electrolyte 204 is formed between the second portion 303b and the first portion 303a in the interconnector; and the eighth portion 303h in the interconnector. Further, when FIG. 4 is viewed from the second fuel electrode 302 side of the second power generation element 30, a dense second solid electrolyte 304 is formed between the third portion 303c in the interconnector and the fifth portion 303e in the interconnector. Accordingly, the gas sealing property of the interconnector 303 is well ensured.

In the present invention, the larger the junction distance between the solid electrolyte in one of adjacent power generation elements and the interconnector and between the solid electrolyte in the other adjacent power generation element and the interconnector is, the better the results are. The junction distance is preferably not less than twice the thickness of the solid electrolyte. Here, the junction distance between the solid electrolyte and the interconnector refers to the total of the length of junction between the solid electrolyte and the interconnector. Specifically, the junction distance is a value obtained by adding the length of a portion of junction between the solid electrolyte in one of adjacent power generation elements and the interconnector to the length of a portion of junction between the solid electrolyte in the other adjacent power generation element and the interconnector. Specifically, for example, in the solid oxide fuel cell stack 230 illustrated in FIG. 3, the junction distance is a total length of d1+d2+d3 wherein d1 represents a length of a portion of junction between the first portion 303a in the interconnector and the first solid electrolyte 204; d2 represents a length of a portion of junction between the second portion 303b in the interconnector and the first solid electrolyte 204; and d3 represents a length of a portion of junction between the third portion 303c in the interconnector and the second solid electrolyte 304. In the solid oxide fuel cell stack 230, the length (d1+d2+d3) is preferably twice or more the length (L1) along Z axis direction of the first solid electrolyte 204 arranged in the fourth area 24. By virtue of this construction, the adhesion between the solid electrolyte and the interconnector and the gas sealing property of the interconnector can be obtained. As shown in FIG. 4, in the solid oxide fuel cell stack 240, the junction distance is a total length of d1+d2+d3+d4+d5 wherein d1+d2 represents a total length of a portion of junction between each of the first portion 303a and the second portion 303b in the interconnector and the first solid electrolyte 204; d3 represents a length of a portion of junction between the third portion 303c in the interconnector and the second solid electrolyte 304; d4 represents a length of a portion of junction between the eighth portion 303h in the interconnector and the first solid electrolyte 204; and d5 represents a length of a portion of junction between the fifth portion 303e in the interconnector and the second solid electrolyte 304. In the solid oxide fuel cell stack 240, the junction distance (d1+d2+d3+d4+d5) is four times or more of the length (L1) along Z axis direction of the first solid electrolyte 204 arranged in the fourth area 24. The junction distance and thickness can be determined by the following method. At the outset, a prepared solid oxide fuel cell stack is cut to obtain a sample including one of adjacent power generation elements and the other adjacent power generation element. The junction distance may be determined by observing the cut plane three times with a scanning electron microscope (SEM) at any magnification of 1 to 100 folds, adding the maximum value of the junction distance to the minimum value of the junction distance, and dividing the total by 2. The thickness may be determined in the same manner as described just above.

In the present invention, preferably, the total length A of the length along X axis direction of the fifth area 25 and the length along X axis direction of the seventh area 27 is equal to or longer than the length A' along X axis direction between the first solid electrolyte 204 and the second solid electrolyte 304, and the length L along X axis direction from the fifth area 303e in the interconnector to the second air electrode 305 is equal to or shorter than the length L' along X axis direction in the fifth portion 303e in the interconnector. A construction that meets A/A'≥1 can increase an electrically conductive area of the interconnector, contributing to enhanced electrical conductivity. Two adjacent power generation elements will be described using the second power generation element 30 and the third power generation element 40 illustrated in FIG. 2. The surface of the interconnector is covered with the second air electrode 305 in the second power generation element so as to meet A/A'≥1. Specifically, a part of three portions of the interconnector that are consecutively adjacent in X axis direction, that is, the sixth portion 303f in the interconnector in the fifth area 35 in the second power generation element 30, the tenth portion 330j in the interconnector in the seventh area 37 in the second power generation element 30, and the fifth portion 303e in the interconnector being a part of the third area 43 in X axis direction in the third power generation element 40, is covered with the second air electrode 305 in the second power generation element 30. That is, the second air electrode 305 covers the whole surface of the sixth portion 303f in the interconnector and the whole surface of the tenth portion 330j in the interconnector but does not cover the surface of the fifth portion 303e in the interconnector.

A construction that meets L/L'≤1 can reduce the distance between adjacent power generation elements and can reduce resistance between power generation elements. The interconnector and the third air electrode 405 in the third power generation element 40 are provided close to each other so as to meet L/L'≤1 wherein L represents the length along X axis direction from the fifth portion 303e in the interconnector to the third air electrode 405 in the third power generation element 40; and L' represents the length along X axis direction of the fifth portion 303e in the interconnector.

When A is equal to or longer than A' and L is equal to or shorter than L', the electrical conductivity of the interconnector can be enhanced and, at the same time, electrical resistance between adjacent power generation elements can be reduced, contributing to an increase in power generation output of the solid oxide fuel cell stack.

The length (A, A', L, L') can be determined as follows. The prepared solid oxide fuel cell stack is cut to obtain a sample including one of adjacent power generation elements and the other adjacent power generation element. The length can be determined by observing the cut plane three times with a scanning electron microscope (SEM) at any magnification of 1 to 100 folds, adding the maximum value to the minimum value, and dividing the total by 2. Each junction distance can be determined in the same manner as described just above.

In a preferred embodiment of the present invention, the solid oxide fuel cell stack meets A/A'≤1.5 or less. In a preferred embodiment of the present invention, the solid oxide fuel cell stack meets 0.5≤L/L'. By virtue of these constructions, the distance between power generation elements can be brought to a distance range that does not deteriorate power generation performance, contributing to an enhanced output of the solid oxide fuel cell stack.

In the present invention, preferably, a requirement of length A=length A'+length L' is met. When it is describing with reference to FIG. 2, in the power generation element 10 and the power generation element 20, preferably, the end in X axis direction of the air electrode 105 in the power generation element 10 flushes with the end in X axis of the interconnector (303a, 303b, 303f, and 303j). The air electrode 105 in the power generation element 10 covers exactly the whole surface of the interconnector (303a, 303b, 303f, and 303j). A construction that meets A=A'+L' can increase the area of contact between the air electrode 105 and the interconnector (303a, 303b, 303f, and 303j). As a result, the electrically conductive area of the interconnector (303a, 303b, 303f, and 303j) can be increased, contributing to enhanced electrical conductivity. Thus, the power generation output of the power generation element can be improved.

In the above embodiment, the interconnectors 303a and 303b provided on the upper side of the solid electrode 104 in the power generation element 10 can prevent leakage of oxide ions produced as a result of contact between the air electrode 105 in the power generation element 10 and the solid electrolyte 104 in the power generation element 10. Therefore, the formation of a counter cell can be suppressed.

In a preferred embodiment of the present invention, in the solid oxide fuel cell stack, both of the solid electrolyte in one of power generation elements and the solid electrolyte in the other power generation element and the interconnector contain strontium, and the content of strontium contained in the interconnector is higher than that contained in each of the solid electrolytes. When both the solid electrolytes and the interconnector contain strontium, diffusion of strontium occurs during firing, resulting in enhanced denseness and adhesion. Specifically, when the solid electrolyte is joined to the interconnector formed of $Sr_xLa_yTiO_{3-\delta}$ wherein x and y are a positive real number that meets $0.8 \leq x+y \leq 1.0$ and $0.01 < y \leq 0.1$, $Sr_xLa_yTiO_{3-\delta}$ having a higher Sr content than the solid electrolyte and having a high reactivity with the solid electrolyte, both the materials are reacted during firing to improve the adhesion between the solid electrolyte and the interconnector. Preferably, the solid electrolyte is a Sr-doped lanthanum gallate-based oxide. As a result, a gas sealing property between the solid electrolyte and the interconnector can be improved.

Method for Manufacturing Solid Oxide Fuel Cell Stack

The solid oxide fuel cell stack according to the present invention may be manufactured by any method without particular imitation to particular method. For example, the solid oxide fuel cell stack according to the present invention can be manufactured as follows. The manufacturing method will be described by taking, as an example, a fuel electrode as an inner electrode and an air electrode as an outer electrode.

For example, the support can be prepared as follows. At the outset, a solvent (for example, water or alcohol) is added to a raw material powder to prepare a green body. In this case, dispersants, binders, defoamers, or pore forming agents or a combination thereof may be added as optional ingredients. For example, sheet molding, press molding, and extrusion molding are used for molding of the green body. When a support with a gas passage formed in the interior thereof is molded, extrusion molding is preferably used. When a support having a multi-layered structure is molded, in addition to multi-layer extrusion molding in which a plurality of layers are extruded at a time, a method in which the upper layer is formed by coating or printing may also be used. Specific examples of coating methods include slurry coating methods in which a raw material slurry is coated, tape casting methods, doctor blade methods, and transfer methods. Specific examples of printing methods include screen printing methods and ink jet printing methods. Next, the prepared green body is molded, and the molded product is dried to obtain a support precursor. Thereafter, a preferred method may be adopted in which the support precursor is then calcined (800° C. (inclusive) to 1100° C. (exclusive)) to obtain a porous calcination product for the support and the calcination product for the support is solely fired to obtain a support. Alternatively, the calcination product for the support, together with at least a fuel electrode and others, may be fired to obtain a support. The firing is preferably carried out at 1100° C. (inclusive) to 1400° C. (exclusive).

For example, the interconnector can be prepared as follows. At the outset, a raw material powder is prepared. The raw material powder can be prepared, for example, by a solid phase method. That is, powders of metal oxides as the raw material are weighed so as to provide a desired composition ratio. The powders are mixed in a solution, and the solvent is removed to obtain a powder. The powder is fired, for example, at 1150° C., followed by grinding to prepare a raw material powder. A solvent (for example, water or alcohol) and, if necessary, molding assistants such as dispersants and binders are added to the raw material powder to prepare a slurry or a paste. An interconnector can be obtained by coating the slurry or the paste, drying the the slurry or the paste (80° C. or more to 1100° C. or less, preferably 300° C. or more to 1100° C. or less) to form a dried film and firing the film (1100° C. (inclusive) to 1400° C. (exclusive), preferably 1250° C. (inclusive) to 1400° C. (exclusive)). The coating may be carried out by the above-described methods. Alternatively, a method may be adopted in which each dried film is previously formed as a transfer sheet and the transfer film is applied to a lamination body.

For example, the fuel electrode, the solid electrolyte, and the air electrode can be prepared as follows. A solvent (for example, water or alcohol) and, if necessary, molding assistants such as dispersants and binders are added to the raw material powder to prepare a slurry or a paste. The fuel electrode, the solid electrolyte, and the air electrode can be obtained by coating the slurry or the paste, drying the slurry or the paste (80° C. or more to 1100° C. or less, preferably 300° C. or more to 1100° C. or less) to form a dried film and firing the film (1100° C. (inclusive) to 1400° C. (exclusive), preferably 1250° C. (inclusive) to 1400° C. (exclusive)). The coating may be carried out by the above-described methods. Alternatively, a method may be adopted in which each dried film is previously formed as a transfer sheet and the transfer film is applied to a lamination body.

In a preferred embodiment of the manufacturing method according to the present invention, firing is carried out for each layer formation. That is, the manufacturing method includes at least the steps of: forming a dried film for a fuel electrode on a surface of a support or a calcination product for the support and firing the dried film to form a fuel electrode; forming a dried film for a solid electrolyte and then firing the dried film to form a solid electrolyte; forming a dried film for an interconnector and then firing the dried film to form an interconnector; and forming a dried film for an air electrode and firing the dried film to form an air electrode. A current collecting layer is formed after the formation of the air electrode.

In another preferred embodiment of the manufacturing method according to the present invention, the manufacturing method includes the steps of: preparing a support or a calcination product for the support, forming, on a surface of the support or the calcination product for the support, a dried film for a fuel electrode, a dried film for an interconnector, and a dried film for a solid electrolyte, co-firing (1250° C. (inclusive) to 1400° C. (exclusive)) a stacked molded product including the support and the fried films of the fuel electrode, the interconnector, and the solid electrolyte, then forming a dried film for an air electrode, and firing the whole.

In the above embodiment of the manufacturing method according to the present invention, after the formation of the dried films of the fuel electrode, the interconnector, and the solid electrolyte on the support or the calcination product for the support, co-firing is carried out in which the stacked molded product of these elements is fired at a time. In this embodiment, preferably, the firing is carried out under an oxidizing atmosphere so as to prevent a deterioration in the solid electrolyte and the interconnector, for example, by diffusion of dopant. More preferably, the firing is carried out using a mixed gas composed of air and oxygen under an atmosphere having an oxygen concentration of 20% by mass or more to 30% by mass or less.

In the above embodiment of the manufacturing method according to the present invention, preferably, at least the interconnector and the solid electrolyte are obtained by co-firing (1250° C. (inclusive) to 1400° C. (exclusive)). In firing, elements contained in the interconnector and elements contained in the solid electrolyte are mutually diffused. When elements contained in the interconnector are the same as elements contained in the solid electrolyte, these elements are mutually diffused. Such elements include strontium and lanthanum. By virtue of the mutual diffusion like this, the adhesion between the interconnector and the solid electrolyte can be improved.

Figure 5:
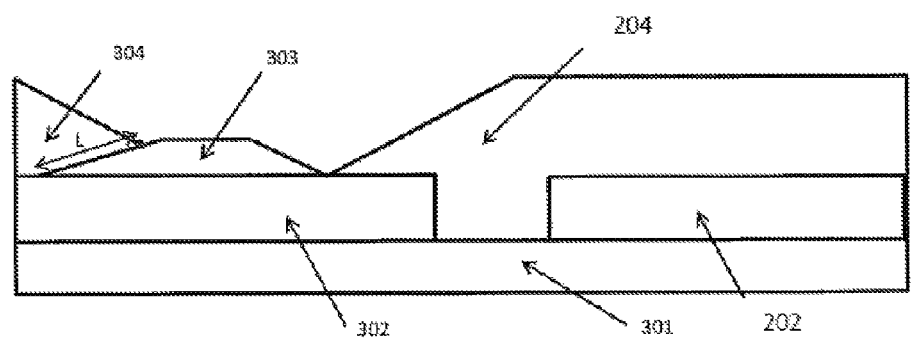
FIG. 5 shows a step of forming an interconnector on a fuel electrode side at a distance of junction L between the interconnector and a solid electrolyte in a method for manufacturing a solid oxide fuel cell stack according to the present invention.
Figure 6:
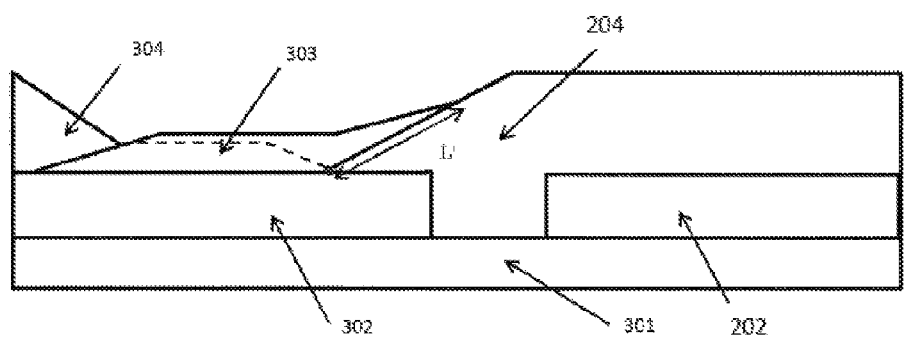
FIG. 6 shows a step of forming an interconnector on an air electrode side at a distance of junction L' between the interconnector and a solid electrolyte in a method for manufacturing a solid oxide fuel cell stack according to the present invention.
Figure 6:
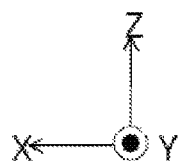

In the manufacturing method according to the present invention, the interconnector may be formed by repeating the procedure a plurality of times depending upon the structure of the interconnector. In this case, the interconnector may be obtained by conducting the firing for each dried film formation, or alternatively, may be obtained by co-firing the dried films at a time. For example, as illustrated in FIGS. 5 and 6, when the interconnector on the fuel electrode side is formed separately from the interconnector on the air electrode side, the following method may be used. The interconnector on the fuel electrode side refers to an interconnector 303c that is formed on the upper side of the fuel electrode 302 in the other adjacent power generation element 30 and joined to the solid electrolyte 304 in the other adjacent power generation element 30. The interconnector on the air electrode side refers to an interconnector (303a and 303b) that is provided on the downside of the air electrode 205 in one adjacent power generation element 20 and joined to the solid electrolyte 204 in the one adjacent power generation element 20. Specifically, a specific method includes the steps of: forming a dried film for an interconnector 303c on a fuel electrode side on a surface of a fuel electrode 302; forming a dried film for a solid electrolyte (204 and 304); forming a dried film for an interconnector (303a and 303b) on an air electrode side; and co-firing the dried film for the interconnector on the fuel side, the dried film for the interconnector on the air electrode side, and the dried film for the solid electrolyte at a time to form an interconnector 303 and a solid electrolyte (204 and 304).

EXAMPLES

The present invention is further illustrated by the following Examples and Comparative Examples that are not intended as a limitation of the scope of the present invention.

Example A1

Preparation of Green Body A for Support

A raw material powder of a high-purity forsterite ($Mg_2SiO_4$ containing 0.05% by mass of CaO) was regulated to a mean particle diameter of 0.7 μm. 100 parts by weight of this powder, 20 parts by weight of a solvent (water), 8 parts by weight of a binder (methylcellulose), 0.5 part by weight of a lubricant, and 15 parts by weight of a pore forming agent (acrylic resin particles having a mean particle diameter of 5 μm) were mixed in a rapid mixer, the mixture was kneaded in a kneader, the kneaded product was deaerated with a vacuum pug mill to prepare a green body for extrusion molding The mean particle diameter was measured according to JIS R1629 and expressed in terms of 50% diameter (the same shall apply hereinafter).

Preparation of Slurry for Fuel Electrode Layer

A NiO powder and a 10YSZ (10 mol % $Y_2O_3$-90 mol % $ZrO_2$) power were mixed together by wet mixing at a weight ratio of 65:35 to obtain a dry powder. The dry powder thus obtained was regulated to a mean particle diameter of 0.7 μm. This powder (150 parts by weight) and 100 parts by weight of a solvent (carbitol) were mixed with 6 parts by weight of a binder (a soluble polymer), 2 parts by weight of a dispersant (a nonionic surfactant), and 2 parts by weight of an defoamer (an organic polymeric substance). The mixture was thoroughly stirred to prepare a slurry.

Preparation of Slurry for Fuel Electrode Catalyst Layer

A mixture of a NiO powder and a GDC10 (10 mol % $GdO_{1.5}$-90 mol % $CeO_2$) powder was prepared by a co precipitation method and was heat-treated to obtain a powder for a fuel electrode catalyst layer. The mixing ratio between the NiO powder and the GDC10 powder was 50/50 in terms of weight ratio. The mean particle diameter of the powder for the fuel electrode catalyst layer was regulated to a mean particle diameter of 0.5 μm. 100 parts by weight or this powder was mixed with 100 parts by weight of a solvent (carbitol), 5 parts by weight of a binder (a soluble polymeric substance), 2 parts by weight of a dispersant (nonionic surfactant), and 2 parts by weight of an defoamer (an organic polymeric substance). The mixture was thoroughly stirred to prepare a slurry.

Preparation of Slurry for Reaction Inhibitory Layer

A powder (50 parts by weight) of cerium-based composite oxide LDC40 (40 mol % $LaO_{1.5}$-60 mol % $CeO_2$) was used as a material for a reaction inhibitory layer. A $Ga_2O_3$ powder (0.04 part by weight) was mixed into the material powder as a sintering aid. Further, 100 parts by weight of a solvent (carbitol), 4 parts by weight of a binder (a soluble polymer), 1 part by weight of a dispersing agent (a nonionic surfactant), and 1 part by weight of an defoamer (a organic polymeric substance) were mixed thereinto, and the mixture was thoroughly stirred to prepare a slurry.

Preparation of Slurry for Solid Electrolyte

An LSGM powder having a composition of $La_{0.9}Sr_{0.1}Ga_{0.8}Mg_{0.2}O_3$ was used as a material for a solid electrolyte. This LSGM powder (50 parts by weight) was mixed with 100 parts by weight of a solvent (carbitol), 4 parts by weight of a binder (a soluble polymer), 1 part by weight of a dispersant (a nonionic surfactant), and 1 part by weight of an defoamer (an organic polymeric substance). The mixture was thoroughly stirred to prepare a slurry.

Preparation of Slurry for Air Electrode

A powder having a composition of $La_{0.6}Sr_{0.4}Co_{0.2}Fe_{0.8}O_3$ was used as a material for an air electrode. This powder (40 parts by weight) was mixed with 100 parts by weight of a solvent (carbitol), 2 parts by weight of a binder (a soluble polymer), 1 part by weight of a dispersant (a nonionic surfactant), and 1 part by weight of an defoamer (an organic polymeric substance). The mixture was thoroughly stirred to prepare a slurry.

Preparation of Raw Material Powder for Interconnector

A raw material powder for an interconnector was prepared by a solid phase method. Metal oxide powders as raw materials were weighed so that strontium, lanthanum, and titanium were present at a composition ratio of a perovskite oxide represented by $Sr_{0.90}La_{0.04}TiO_{3-\delta}$ and were mixed together in a solution. Thereafter, the solvent was removed to give a powder that was then fired at 1150° C. and ground to prepare a raw material powder for an interconnector.

Preparation of Slurry for Interconnector

A raw material powder for an interconnector, the raw material powder having a composition of $Sr_{0.90}La_{0.04}TiO_{3-\delta}$, was used as a material for an interconnector. This powder (40 parts by weight) was mixed with 100 parts by weight of a solvent (carbitol), 4 parts by weight of a binder (a soluble polymer), 1 part by weight of a dispersant (a nonionic surfactant), and 1 part by weight of an defoamer (an organic polymeric substance). The mixture was thoroughly stirred to prepare a slurry.

Preparation of Solid Oxide Fuel Cell Stack

A solid oxide fuel cell stack 220 was prepared by the following method using the green body and each slurry prepared above. An interconnector 303 was formed by two separate steps, that is, by forming an interconnector 303c on a fuel electrode 302 side, the interconnector 303 being provided on the upper side of fuel electrode 302 in the adjacent other power generation element 30 and being provided so as to join to a solid electrolyte 304 in the adjacent other power generation element 30, and by forming inter connectors (303a and 303b) on an air electrode 205 side, the interconnectors 303a and 303b being provided on the downside of the fuel electrode 205 in a one adjacent power generation element 20 and being provided so as to join to a solid electrolyte 204 in adjacent one power generation element 20.

A cylindrical molded body was prepared from a green body A for a porous support by an extrusion molding method. After drying at room temperature, the molded body was heat-treated at 1100° C. for 2 hours to prepare a calcined body for a support. A fuel electrode (202a or 302a), a fuel electrode catalyst layer (202b or 302b), an interconnector 303c on a fuel electrode side, a reaction inhibitory layer (204a or 304a), and a solid electrolyte (204b or 304b) were formed in that order on a surface of the support by a slurry coating method and dried to obtain a laminated molded body including dried layers stacked. The laminated molded body was co-fired at 1300° C. for 2 hr. As illustrated in FIG. 5, the junction distance (L) between the interconnector 303c on the fuel electrode side and the solid electrolyte 304 was 200 µm to 220 µm.

Next, interconnectors (303a and 303b) on an air electrode 205 were formed by a slurry coating method, and then, fired at 1250° C. for 2 hours. As shown in FIG. 6, the junction distance (L') between the interconnectors (303a and 303b) on the air electrode 205 side and the solid electrolyte 204 was 200 µm to 220 µm.

Next, an air electrode (205 or 305) was molded on a surface of a solid electrolyte (204b or 304b), followed by firing at 1100° C. for 2 hours to prepare a solid oxide fuel cell stack 220. A support 301 had a dimension after co-firing of 10 mm in outer diameter and 1 mm in wall thickness. For the solid oxide fuel cell stack 220 thus prepared, the thickness of the fuel electrode (202a or 302a) was 100 µm, the thickness of the fuel electrode catalyst layer (202b or 302b) was 10 µm, the thickness of the reaction inhibitory layer (204a or 304a) was 10 µm, the thickness of the solid electrolyte (204b or 304b) was 30 µm, the thickness of the interconnector 303 was 15 µm, and the thickness of the air electrode (205 or 305) was 20 µm. The outer diameter of the support 301 was measured with a micrometer in a place where no layer was formed. The thickness of each of the members was determined by cutting the cell in the prepared cell stack, observing the cross section with a scanning electron microscope (SEM) at any magnification of 30 to 2000 folds three times, adding the maximum value to the minimum value thus obtained and dividing the total value by 2. The cut place was a central portion of the area where the air electrode layer was formed. For the solid oxide fuel cell stack, each of the following evaluations was carried out. The results are shown in Table 1.

Example A2

A solid oxide fuel cell stack 220 was obtained in the same manner as in Example 1, except that, for both the interconnectors (303c; and 303a and 303b) on the fuel electrode 302 side and the air electrode 205 side, the junction distance between each of the interconnectors (303c; and 303a and 303b) and the solid electrolytes (304, 204) was 40 µm to 60 µm. For the solid oxide fuel cell stack 220, each of the following evaluations were carried out. The results are shown in Table 1.

Comparative Example A1

Figure 7:
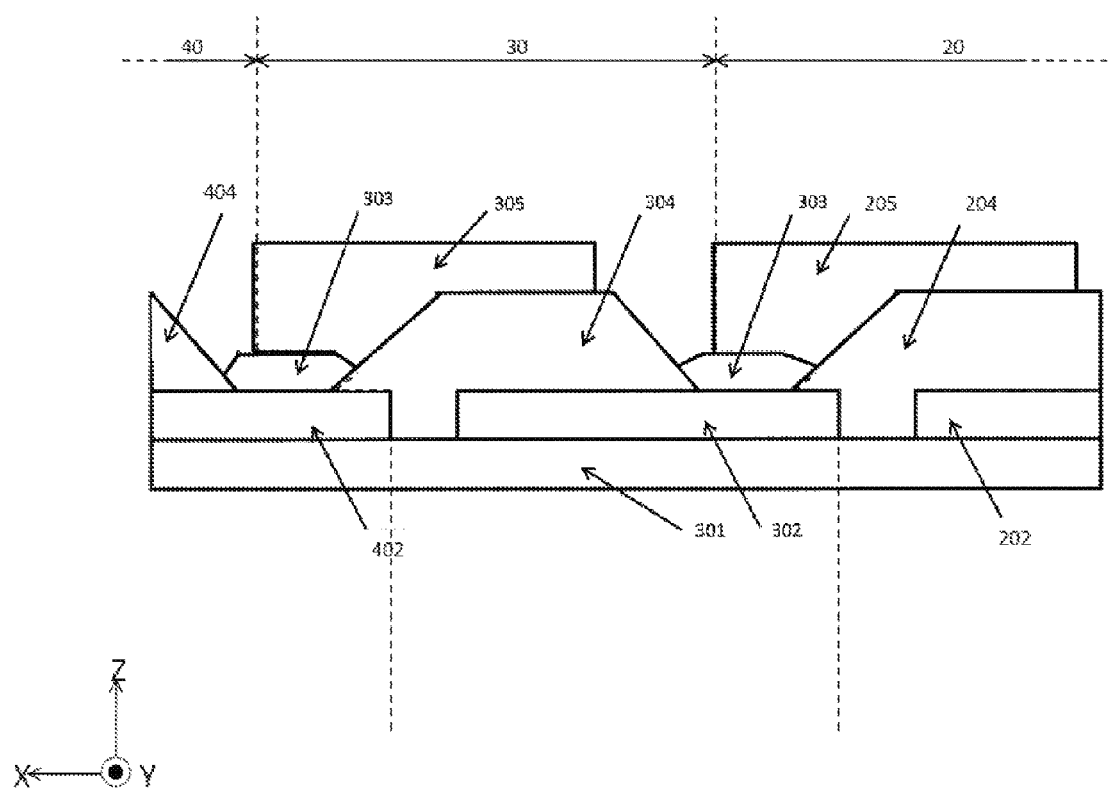
FIG. 7 is a cross-sectional schematic view of a solid oxide fuel cell stack prepared in a comparative Example.

For example, as shown in FIG. 7, a solid oxide fuel cell stack was obtained in the same manner as in Example 1, except that the layer of the interconnector 303c on the fuel electrode 302 side was not formed, and, after co-firing of the laminated molded body, the interconnector layers (303a and 303b) on the air electrode 205 side were formed and fired. The junction distance between the interconnector 303 and the solid electrolytes (304, 204) was 5 to 10 µm. For the solid oxide fuel cell stack thus obtained, each of the following evaluations was carried out. The results are shown in Table 1.

Comparative Example A2

For example, as illustrated in FIG. 7, a solid oxide fuel cell stack was obtained in the same manner as in Example 1, except that the layer of the interconnector 303c on the fuel electrode 302 was not formed, and, after the co-firing of the laminated molded body, the layers of the interconnectors (303a and 303b) on the air electrode 205 side were formed and fired. The junction distance between the interconnector 303 and the solid electrolytes (304, 204) was 20 to 30 µm. For the solid oxide fuel cell stack thus obtained, each of the following evaluations was carried out. The results are shown in Table 1.

Evaluation
Measurement of OCV

A power generation test was carried out using the solid oxide fuel cell stack thus obtained. A current collector on the fuel electrode side was formed by cladding a current collecting metal to an exposed area of the fuel electrode with a silver paste. A current collector on the air electrode side was formed by cladding a current collecting metal to an exposed area of an adjacent fuel electrode with a silver paste.

A power generation test was carried out under the following power generation conditions, and the electromotive force 0 hour after the operation (OCV (V)) was measured. The results are shown in Table 1.

Fuel gas: mixed gas composed of ($H_2$+3% $H_2O$) and $N_2$ (mixed ratio $H_2:N_2$=7:4 (vol:vol))

Oxidation gas: air

Operating temp.: 700° C.

Measurement of Critical Fuel Utilization Factor

A power generation test was carried out while energizing at a current density of 0.4 A/cm$^2$ under the above conditions for the power generation test. Thereafter, the amount of the fuel gas supplied was gradually reduced, the amount of hydrogen supplied just before a rapid drop of the potential was measured, and the critical fuel utilization factor was calculated by the following equation. The results are shown in Table 1.

Critical fuel utilization factor=(Amount of hydrogen used in power generation)/(Amount of hydrogen supplied just before rapid drop of potential)×100

The amount of hydrogen used in the power generation was determined by the formula; amount of current (C/s)×60 (s)×22.4 (L/mol)÷Faraday constant (C/mol)×½ (valence)×number of power generation elements.

TABLE 1

| | Junction Distance on fuel electrode side (L, μm) | Junction Distance on air electrode side (L', μm) | OCV (V) | Critical fuel utilization factor (%) |
|---|---|---|---|---|
| Example A1 | 200 to 220 | 200 to 220 | 1.15 | 69 |
| Example A2 | 40 to 60 | 40 to 60 | 1.14 | 69 |
| Comparative Example A1 | None | 5 to 10 | 1.10 | 52 |
| Comparative Example A2 | None | 20 to 30 | 1.11 | 53 |

Example B1

A green body A for a support, a slurry for a fuel electrode layer, a slurry for a fuel electrode catalyst layer, a slurry for a reaction inhibitory layer, a slurry for a solid electrolyte, a raw material powder for an interconnector, a slurry for an interconnector, and a slurry for an air electrode were prepared in the same manner as in Example A.

Preparation of Solid Oxide Fuel Cell Stack

A solid oxide fuel cell stack was prepared by the following method using the green body and each slurry obtained as described above.

A cylindrical molded body was prepared from a green body A for a porous support by an extrusion molding method. The molded body was dried at room temperature and was heat-treated at 1100° C. for 2 hours to prepare a calcined body for a support. A fuel electrode, a fuel electrode catalyst layer, a reaction inhibitory layer, and a solid electrolyte were formed on a surface of the support by a slurry coating method and dried to obtain a laminated molded body including dried layers stacked. The laminated molded body was co-fired at 1300° C. for 2 hours.

Next, a layer of an interconnector was formed by a slurry coating method and fired at 1250° C. for 2 hours.

Next, an air electrode was molded on a surface of the solid electrolyte so as to meet a requirement of L/L'=0.7 and A/A'=1.1, followed by firing at 1100° C. for 2 hours to prepare a solid oxide fuel cell stack. The support had a dimension after co-firing of 10 mm in outer diameter and 1 mm in wall thickness. For the solid oxide fuel cell stack thus prepared, the thickness of the fuel electrode was 100 μm, the thickness of the fuel electrode catalyst layer was 10 μm, the thickness of the reaction inhibitory layer was 10 μm, the thickness of the solid electrolyte was 30 μm, the thickness of the interconnector was 15 μm, and the thickness of the air electrode was 20 μm. The outer diameter of the support was measured with a micrometer in a place where no layer was formed. The thickness of each of the members was determined by cutting the cell in the prepared cell stack, observing the cross section with a scanning electron microscope (SEM) at any magnification of 30 to 2000 folds three times, adding the maximum value to the minimum value thus obtained and dividing the total value by 2. The cut place was a central portion of the area where the air electrode layer was formed. For the solid oxide fuel cell stack, each of the following evaluations was carried out. The results are shown in Table 2.

Example B2

A solid oxide fuel cell stack was obtained in the same manner as in Example Bib 1, except that the air electrode layer was molded so as to meet a requirement of L/L'=0.7 and A/A'=1.0. For the solid oxide fuel cell stack, each of the evaluations was carried out. The results are shown in Table 2.

Example B3

A solid oxide fuel cell stack was obtained in the same manner as in Example Bib 1, except that the air electrode layer was molded so as to meet a requirement of L/L'=1.0 and A/A'=1.1. For the solid oxide fuel cell stack, each of the evaluations was carried out. The results are shown in Table 2.

Example B4

A solid oxide fuel cell stack was obtained in the same manner as in Example B1, except that the air electrode layer was molded so as to meet a requirement of L/L'=1.0 and A/A'=1.0. For the solid oxide fuel cell stack, each of the evaluations was carried out. The results are shown in Table 2.

Example B5

A solid oxide fuel cell stack was obtained in the same manner as in Example B 1, except that the air electrode layer was molded so as to meet a requirement of L/L'=0.7 and A/A'=1.5, that is, A=A'+L'. For the solid oxide fuel cell stack, each of the evaluations was carried out. The results are shown in Table 2.

Example B6

A solid oxide fuel cell stack was obtained in the same manner as in Example B 1, except that the air electrode layer was molded so as to meet a requirement of =0.5 and A/A'=1.0. For the solid oxide fuel cell stack, each of the evaluations was carried out. The results are shown in Table 2.

Example B7

A solid oxide fuel cell stack was obtained in the same manner as in Example B 1, except that the air electrode layer was molded so as to meet a requirement of L/L'=0.7 and A/A'=0.8. For the solid oxide fuel cell stack, each of the evaluations was carried out. The results are shown in Table 2.

Example B8

A solid oxide fuel cell stack was obtained in the same manner as in Example B 1, except that the air electrode layer was molded so as to meet a requirement of =1.5 and A/A'=1.1. For the solid oxide fuel cell stack, each of the evaluations was carried out. The results are shown in Table 2.

Evaluation

Measurement of Terminal Voltage

The voltage between terminals was measured under the following power generation conditions by connecting a potential wire and a current wire to the fuel electrode in one of the adjacent power generation elements and to the fuel electrode in the adjacent other power generation element. The results are shown in Table 2.

Fuel gas: mixed gas composed of ($H_2$+3% $H_2O$) and $N_2$ (mixed ratio $H_2:N_2$=7:4 (vol:vol))
Fuel utilization: 7%
Oxidation gas: air
Operating temp.: 700° C.
Current density: 0.4 A/cm$^2$

TABLE 2

| | L/L' | A/A' | Terminal voltage |
|---|---|---|---|
| Example B1 | 0.7 | 1.1 | 690 mV |
| Example B2 | 0.7 | 1.0 | 690 mV |
| Example B3 | 1.0 | 1.1 | 680 mV |
| Example B4 | 1.0 | 1.0 | 680 mV |
| Example B5 | 0.7 | 1.5 | 680 mV |
| Example B6 | 0.5 | 1.0 | 700 mV |
| Example B7 | 0.7 | 0.8 | 660 mV |
| Example B8 | 1.5 | 1.1 | 660 mV |

What is claimed is:

1. A solid oxide fuel cell stack comprising:
a support; and
a plurality of power generation elements provided on a surface of the support, wherein
when two adjacent power generation elements in the plurality of power generation elements are a first power generation element and a second power generation element, respectively,
the first power generation element comprises,
a first fuel electrode,
a first air electrode, and
a first solid electrolyte provided between the first fuel electrode and the first air electrode,
the first fuel electrode being provided between the support and the first air electrode,
the second power generation element comprises,
a second fuel electrode,
a second air electrode, and
a second solid electrolyte provided between the second fuel electrode and the second air electrode,
the second fuel electrode being provided between the support and the second air electrode,
the solid oxide fuel cell stack further comprises an interconnector that electrically connects the first air electrode to the second fuel electrode,
the first power generation element is connected in series with the second power generation element through the interconnector,
when a vertical direction from the surface of the support to the first fuel electrode, the first solid electrolyte, and the first air electrode or a vertical direction from the surface of the support to the second fuel electrode, the second solid electrolyte, and the second air electrode is in a Z axis direction,
the two adjacent power generation elements include
a first area of the first power generation element, the first area including the second fuel electrode, the first solid electrolyte, and the first air electrode arranged in that order in the Z axis direction,
a second area of the first power generation element, the second area including the first solid electrolyte and the first air electrode arranged in that order in the Z axis direction,
a third area of the second power generation element, the third area including the second fuel electrode and the second solid electrolyte arranged in that order in the Z axis direction,
a fourth area of the first power generation element, the fourth area including the first fuel electrode, the first solid electrolyte, and the first air electrode arranged in that order in the Z axis direction, and
a fifth area of the first power generation element, the fifth area including the second fuel electrode and the first air electrode arranged in that order in the Z axis direction,
when a direction that is vertical to the Z axis direction and in which oxide ions migrate is an X axis direction,
the fourth area, the second area, the first area, the fifth area, and the third area are continuously adjacent in that order in the X axis direction, and
the interconnector includes
a sixth portion provided between the second fuel electrode and the first air electrode in the fifth area,
a first portion provided between the first solid electrolyte and the first air electrode in the second area,
a second portion provided between the first solid electrolyte and the first air electrode in the first area, and
a third portion provided between the second fuel electrode and the second solid electrolyte in the third area.

2. The solid oxide fuel cell stack according to claim 1, wherein the total length of a length d1 of junction between the first portion and the first solid electrolyte, a length d2 of junction between the second portion and the first solid electrolyte, and a length d3 of junction between the third portion and the second solid electrolyte, i.e., d1+d2+d3, is twice or longer than a length L1 along the Z axis direction of the first solid electrolyte arranged in the fourth area.

3. The solid oxide fuel cell stack according to claim 1, wherein the interconnector further comprises an eighth portion provided between the second fuel electrode and the first solid electrolyte in the first area.

4. The solid oxide fuel cell stack according to claim 1, wherein the interconnector further comprises a fifth portion that, in the third area, is provided on the second solid electrolyte while providing spacing between the fifth portion and the second air electrode in the X axis direction.

5. The solid oxide fuel cell stack according to claim 1, wherein the two adjacent power generation elements further comprise a seventh area of the first power generation element, the seventh area including the second fuel electrode, the second solid electrolyte, and the first air electrode arranged in that order in the Z axis direction, the seventh area is arranged between the fifth area and the third area in the X axis direction, the interconnector further comprises a tenth portion provided between the second solid electrolyte and the first air electrode in the seventh area, and the tenth portion is provided between the sixth portion and the fifth portion in the X axis direction.

6. The solid oxide fuel cell stack according to claim 4, wherein the total length A of a length of the fifth area in the X axis direction and a length of the seventh area in the X axis direction is equal to or longer than a length A' of a portion between the first solid electrolyte and the second solid electrolyte in the X axis direction, and a length L from the fifth portion to the second air electrode in the X axis direction is equal to or shorter than a length L' of the fifth portion in the X axis direction.

7. The solid oxide fuel cell stack according to claim 6, wherein the length A is equal to the length A' plus the length L', i.e., the length A=the length A'+the length L'.

8. The solid oxide fuel cell stack according claim 1, wherein the two adjacent power generation elements further comprises a sixth area of the second power generation element, the sixth area consisting of the second fuel electrode in the Z axis direction, the sixth area is arranged between the fifth area and the third area in the X axis direction, and the interconnector further comprises, in the sixth area, a seventh portion that is provided on the second fuel electrode and between the sixth portion or the tenth portion and the fifth portion in the X axis direction.

9. The solid oxide fuel cell stack according to claim 1, wherein the first solid electrolyte and the second solid electrolyte and the interconnector each contain strontium and the amount of strontium contained in the interconnector is larger than the amount of strontium contained in the first solid electrolyte or the second solid electrolyte.

10. The solid oxide fuel cell stack according to claim 1, wherein the interconnector is formed of a perovskite oxide represented by $Sr_xLa_yTiO_{3-\delta}$ wherein x and y are a positive real number that satisfies $0.8 \leq x+y \leq 1.0$ and $0.01 < y \leq 0.1$.

* * * * *